(12) United States Patent
Stousland et al.

(10) Patent No.: US 9,452,899 B2
(45) Date of Patent: *Sep. 27, 2016

(54) TRANSFER MECHANISM FOR USE WITH A FOOD PROCESSING SYSTEM

(71) Applicant: Lyco Manufacturing, Inc., Columbus, WI (US)

(72) Inventors: Glenn W. Stousland, Beaver Dam, WI (US); David R. Zittel, Columbus, WI (US); Daniel D. Maupin, Corvalis, OR (US); Steven J. Schultz, Beaver Dam, WI (US); Scott K. Weisman, Columbus, WI (US)

(73) Assignee: Lyco Manufacturing Inc., Columbus, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,510

(22) Filed: Sep. 4, 2014

(65) Prior Publication Data

US 2014/0366749 A1 Dec. 18, 2014

Related U.S. Application Data

(60) Continuation of application No. 13/303,740, filed on Nov. 23, 2011, now Pat. No. 8,839,712, which is a division of application No. 12/501,649, filed on Jul. 13, 2009, now Pat. No. 8,006,613, which is a continuation-in-part of application No. 12/174,297, filed on Jul. 16, 2008, now Pat. No. 9,060,530.

(51) Int. Cl.
*A23N 12/04* (2006.01)
*B65G 53/30* (2006.01)
(Continued)

(52) U.S. Cl.
CPC ............... *B65G 53/30* (2013.01); *A23L 1/01* (2013.01); *A23L 3/185* (2013.01); *A23N 12/04* (2013.01); *A47J 36/00* (2013.01); *B65G 51/01* (2013.01)

(58) Field of Classification Search
USPC ......... 99/361, 406, 443 C; 406/92, 144, 171, 406/194, 195
See application file for complete search history.

(56) References Cited

U.S. PATENT DOCUMENTS

| 1,908,220 A | 5/1933 | Chapman |
| 1,992,890 A | 2/1935 | Schmidt |

(Continued)

FOREIGN PATENT DOCUMENTS

| EP | 1255453 | 11/2002 |
| EP | 1704783 | 9/2006 |
| EP | 09251796 | 1/2010 |

OTHER PUBLICATIONS

Idaho Steel, Product Detail—Blancher or Preheater, available online at: <http://www.idahosteel.com/Blancher.htm>, at least as early as Aug. 2008.

(Continued)

*Primary Examiner* — Joseph Dillon, Jr.
(74) *Attorney, Agent, or Firm* — George R. Corrigan

(57) ABSTRACT

A transfer mechanism for transferring food product from a compartment of a food processing system includes a conduit having a first end portion configured to be in communication with the compartment and a second end portion, a fluid discharge positioned substantially within the conduit between the first end portion and the second end portion, and a pressurized fluid source in communication with the fluid discharge. The pressurized fluid source is operable to propel a fluid through the fluid discharge to move the food product from the first end portion of the conduit toward the second end portion.

11 Claims, 15 Drawing Sheets

(51) Int. Cl.
    *A23L 1/01*    (2006.01)
    *A23L 3/18*    (2006.01)
    *B65G 51/01*   (2006.01)
    *A47J 36/00*   (2006.01)

(56) References Cited

U.S. PATENT DOCUMENTS

| | | | |
|---|---|---|---|
| 2,299,080 A | 10/1942 | DeBack | |
| 2,314,871 A | 3/1943 | DeBack | |
| 3,722,401 A * | 3/1973 | Davidson | A23N 12/00 134/105 |
| 3,731,647 A | 5/1973 | Mimbiole et al. | |
| 3,760,714 A | 9/1973 | Lortz | |
| 3,918,116 A | 11/1975 | Valdespino | |
| 3,982,481 A * | 9/1976 | Console | A23B 7/06 99/477 |
| 4,097,092 A | 6/1978 | Lapple | |
| 4,183,702 A | 1/1980 | Bonnel | |
| 4,206,555 A | 6/1980 | Musto | |
| 4,349,280 A | 9/1982 | Lodige | |
| 4,451,184 A | 5/1984 | Mitchell | |
| 4,604,948 A * | 8/1986 | Goldhahn | A23B 7/06 99/470 |
| 4,702,161 A * | 10/1987 | Andersen | A23B 7/06 99/470 |
| 4,711,607 A | 12/1987 | Wynosky et al. | |
| 4,762,148 A | 8/1988 | Marui et al. | |
| 4,846,608 A | 7/1989 | Sanders | |
| 4,942,810 A | 7/1990 | Zittel et al. | |
| 5,009,150 A | 4/1991 | Andersen | |
| 5,069,582 A | 12/1991 | Young | |
| 5,092,526 A | 3/1992 | Takata | |
| 5,133,982 A | 7/1992 | Bodkin et al. | |
| 5,329,842 A | 7/1994 | Zittel | |
| 5,427,016 A | 6/1995 | Dunckel | |
| 5,429,041 A | 7/1995 | Zittel | |
| 5,429,156 A | 7/1995 | Ueda et al. | |
| 5,517,906 A * | 5/1996 | Zittel | A23L 3/02 134/63 |
| 5,568,755 A | 10/1996 | Mendenhall | |
| 5,752,431 A | 5/1998 | Zittel | |
| 5,755,880 A | 5/1998 | Norman et al. | |
| 5,802,961 A | 9/1998 | Hay et al. | |
| 5,908,032 A * | 6/1999 | Poindexter | A24B 3/182 131/291 |
| 5,931,609 A | 8/1999 | Sickles | |
| 5,972,413 A | 10/1999 | Whitney et al. | |
| 6,009,798 A | 1/2000 | Ledet et al. | |
| 6,205,913 B1 | 3/2001 | Zittel et al. | |
| 6,974,279 B2 | 12/2005 | Morohashi et al. | |
| 7,144,204 B2 | 12/2006 | Hilgraf | |
| 7,311,474 B1 | 12/2007 | Ogasahara et al. | |
| 7,500,426 B2 | 3/2009 | Zittel et al. | |
| 7,735,415 B2 | 6/2010 | Zittel et al. | |
| 8,006,613 B2 | 8/2011 | Stousland et al. | |
| 8,087,348 B2 * | 1/2012 | Maupin | A23B 7/06 99/348 |
| 8,191,466 B2 * | 6/2012 | Maupin | A23B 4/26 99/348 |
| 8,776,674 B2 * | 7/2014 | Maupin | A23B 7/06 99/348 |
| 8,800,435 B2 * | 8/2014 | Maupin | A23B 4/26 99/348 |
| 8,839,712 B2 | 9/2014 | Stousland et al. | |
| 2006/0283333 A1 | 12/2006 | Zittel et al. | |
| 2007/0044666 A1 | 3/2007 | Zittel et al. | |
| 2010/0015311 A1 | 1/2010 | Stousland et al. | |
| 2010/0043649 A1 | 2/2010 | Maupin | |
| 2011/0005241 A1 * | 1/2011 | Zittel | A23L 3/361 62/63 |
| 2011/0072980 A1 * | 3/2011 | Maupin | A23B 4/26 99/348 |
| 2011/0209869 A1 * | 9/2011 | Smith | E21B 43/16 166/260 |
| 2012/0085246 A1 * | 4/2012 | Maupin | A23B 7/06 99/443 C |
| 2012/0216685 A1 * | 8/2012 | Maupin | A23B 4/26 99/443 C |
| 2013/0037494 A1 * | 2/2013 | Cook | B01D 21/0069 210/800 |
| 2013/0319342 A1 * | 12/2013 | Musser | A01K 61/008 119/227 |
| 2014/0311357 A1 * | 10/2014 | Maupin | A23B 7/06 99/404 |
| 2015/0108073 A1 * | 4/2015 | Cook | B01D 21/0069 210/800 |

OTHER PUBLICATIONS

G. J. Olney, Inc., Destoning Washer with E-Z Clean Stone Crib for Peas and Lima Beans, Brochure, Bulletin 96SB29, available at least as early as Aug. 2008.

Venturi Jet Pumps Ltd., Hooper Eductors, Hopper Eductors for pumping and conveying granular solids and powders, available online at: <http://www.venturipumps.com/hoppereductor.htm>, available at least as early as Aug. 2008.

Stratton, Harry, "Liquid Jet Eductors—The "Pumps" with No Moving Parts", Plant Engineering, Apr. 29, 1976.

Schutte & Koerting, Solids Handling Eductors Eductors Using Liquid in Handling Dry Solids, available online at: <http://www.s-k.com/pages/pro.sub.--02.sub.--02.html>, available at least as early as May 2009.

Northeast Controls Inc., Intermittent Operation Arrangement, available online at: <http://www.nciweb.net/newpage61.htm>, available at least as early as May 2009.

Schutte & Koerting, Eductors & Syphons—Annular Multi-Nozzle Eductor, available online at: <http://www.s-k.com/pages/pro.sub.--01.sub.--07.html>, available at least as early as May 2009.

Derbyshire Machine & Tool Co., Peri-Jets & Eductors, available online at: <http://www.derbyshiremachine.com/perijet.html>, available at least as early as Jun. 2008.

Exair, How the Exair Line Vac Works, Air Operated Conveyors, available online at: <http://www.exair.com/en-US/Primary%20Navigation/Products/Air%20Operated%20Conveyors/Pages/How%20Line%20Vac%20Works.aspx>, available at least as early as May 2009.

* cited by examiner

TRANSFER MECHANISM FOR USE WITH A FOOD PROCESSING SYSTEM

RELATED APPLICATIONS

This is a continuation of, and claims the benefit of the filing date of, U.S. patent application Ser. No. 13/303,740, filed on Nov. 23, 2011, which issued on Sep. 23, 2014 as U.S. Pat. No. 8,839,712, which is a division of, and claims the benefit of the filing date of, U.S. patent application Ser. No. 12/501,649, filed on Jul. 13, 2009, which issued on Aug. 30, 2011 as U.S. Pat. No. 8,006,613, which is a continuation in part of, and claims the benefit of the filing date of, U.S. patent application Ser. No. 12/174,297, filed on Jul. 16, 2008.

FIELD OF THE INVENTION

The present invention relates to food processing systems and, more particularly, to transfer mechanisms for use with food processing systems.

BACKGROUND

In mass processing of food product, the food product is often heated by cooking or blanching the food product in a cooker using a hot heat transfer medium into which the food product is immersed. After cooking or blanching, the food product is either transferred out of the food processing system, or is cooled or chilled by immersing the food product in a cool heat transfer medium so that the food product may be packaged, stored, and/or shipped. It is desirable to transfer the food product between these mediums while minimizing, for example, crossover of the hot heat transfer medium into the cool heat transfer medium. In addition, it is desirable to transfer the food product between processing systems or out of a processing system entirely while minimizing loss or waste of the heat transfer mediums.

SUMMARY

In one embodiment, the invention may provide a transfer mechanism for transferring food product from a compartment of a food processing system. The transfer mechanism may generally include a conduit having a first end portion configured to be in communication with the compartment and a second end portion, a fluid discharge positioned substantially within the conduit between the first end portion and the second end portion, and a pressurized fluid source in communication with the fluid discharge. The pressurized fluid source is operable to propel a fluid through the fluid discharge to move the food product from the first end portion of the conduit toward the second end portion.

In another embodiment, the invention may provide a food processing system including a first compartment operable to process food product and a transfer mechanism operable to transfer the food product from the first compartment. The transfer mechanism may generally include a conduit having a first end portion in communication with the compartment and a second end portion, a fluid discharge positioned substantially within the conduit between the first end portion and the second end portion, and a pressurized fluid source in communication with the fluid discharge. The pressurized fluid source is operable to propel a fluid through the fluid discharge to move the food product from the first end portion of the conduit toward the second end portion.

In yet another embodiment, the invention may provide a transfer mechanism for transferring food product from a compartment of a food processing system. The transfer mechanism may generally include a conduit having an inlet portion configured to be in communication with the compartment and an outlet portion. The inlet portion is configured to be positioned below a fluid level in the compartment and the outlet portion is configured to be positioned above a fluid level in the compartment. The transfer mechanism also includes a fluid discharge positioned substantially within the conduit between the inlet portion and the outlet portion and a pump in communication with the fluid discharge. The pump is operable to propel a fluid through the fluid discharge to move the food product from the inlet portion of the conduit toward the outlet portion. The transfer mechanism further includes a convex guide member coupled to and in communication with the outlet portion of the conduit and a dewatering member coupled to and in communication with the convex guide member opposite the conduit. The dewatering member is operable to receive the food product and the fluid from the conduit to facilitate separating the food product from the fluid. In some embodiments, the conduit, the convex guide member, and the dewatering member form a generally inverted V-shape.

In a further embodiment, the invention may provide a food processing system including a compartment operable to process a food product, and a transfer mechanism for transferring food product from the compartment. The transfer mechanism may generally include a conduit including a first end portion configured to be in communication with the compartment and a second end portion, the conduit including an inlet conduit section providing the first end portion, the inlet conduit section having an inlet end in fluid communication with the compartment and an opposite end with an outer surface, and a main conduit section having a first end with an inner surface, the opposite end of the inlet conduit section being inserted in the first end of the main conduit section. The transfer mechanism may also include a fluid discharge positioned substantially within the conduit between the first end portion and the second end portion, the fluid discharge including a slot at least partially defined between the outer surface of the opposite end of the inlet conduit section and the inner surface of the first end of the main conduit section, and a pressurized fluid source in communication with the fluid discharge, the pressurized fluid source operable to propel a fluid through the fluid discharge to move the food product from the first end portion of the conduit toward the second end portion.

In another embodiment, the invention may provide a transfer mechanism generally including a conduit including a first end portion configured to be in communication with the compartment and a second end portion, the conduit including an inlet conduit section providing the first end portion, the inlet conduit section having an inlet end in fluid communication with the compartment and an opposite end with an outer surface, the inlet conduit section having a round cross-section and a circumference, and a main conduit section having a first end with an inner surface, the main conduit section having a round cross-section, the opposite end of the inlet conduit section being inserted in the first end of the main conduit section. The transfer mechanism may also include a fluid discharge positioned substantially within the conduit between the first end portion and the second end portion, the fluid discharge including a slot at least partially defined between the outer surface of the opposite end of the inlet conduit section and the inner surface of the first end of the main conduit section, the slot extending about the circumference of the opposite end of the inlet conduit section, and a pressurized fluid source in communication with the fluid discharge, the pressurized fluid source operable to propel a fluid through the slot to move the food product from the first end portion of the conduit toward the second end portion.

In yet another embodiment, the invention may provide a transfer mechanism generally including a conduit including a first end portion configured to be in communication with the compartment and a second end portion, the conduit including an inlet conduit section providing the first end portion, the inlet conduit section having an inlet end in fluid communication with the compartment and an opposite end with an outer surface, the inlet conduit section including two pairs of opposing walls forming a generally rectangular cross-section, and a main conduit section having a first end with an inner surface, the main conduit section including two pairs of opposing walls forming a generally rectangular cross-section, the opposite end of the inlet conduit section being inserted in the first end of the main conduit section. The transfer mechanism may also include a fluid discharge positioned substantially within the conduit between the first end portion and the second end portion, the fluid discharge including a first slot defined between the outer surface of one wall of one pair of opposing walls of the inlet conduit section and the inner surface of one wall of an associated pair of opposing walls of the main conduit section, and an opposing second slot defined between the outer surface of the other wall of the one pair of opposing walls of the inlet conduit section and the inner surface of the other wall of the associate pair of opposing walls of the main conduit section. In addition, the transfer mechanism may include a pressurized fluid source in communication with the fluid discharge, the pressurized fluid source operable to propel a fluid through the first slot and through the second slot to move the food product from the first end portion of the conduit toward the second end portion.

Other independent aspects of the invention will become apparent by consideration of the detailed description, claims and accompanying drawings.

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

Figure 1:
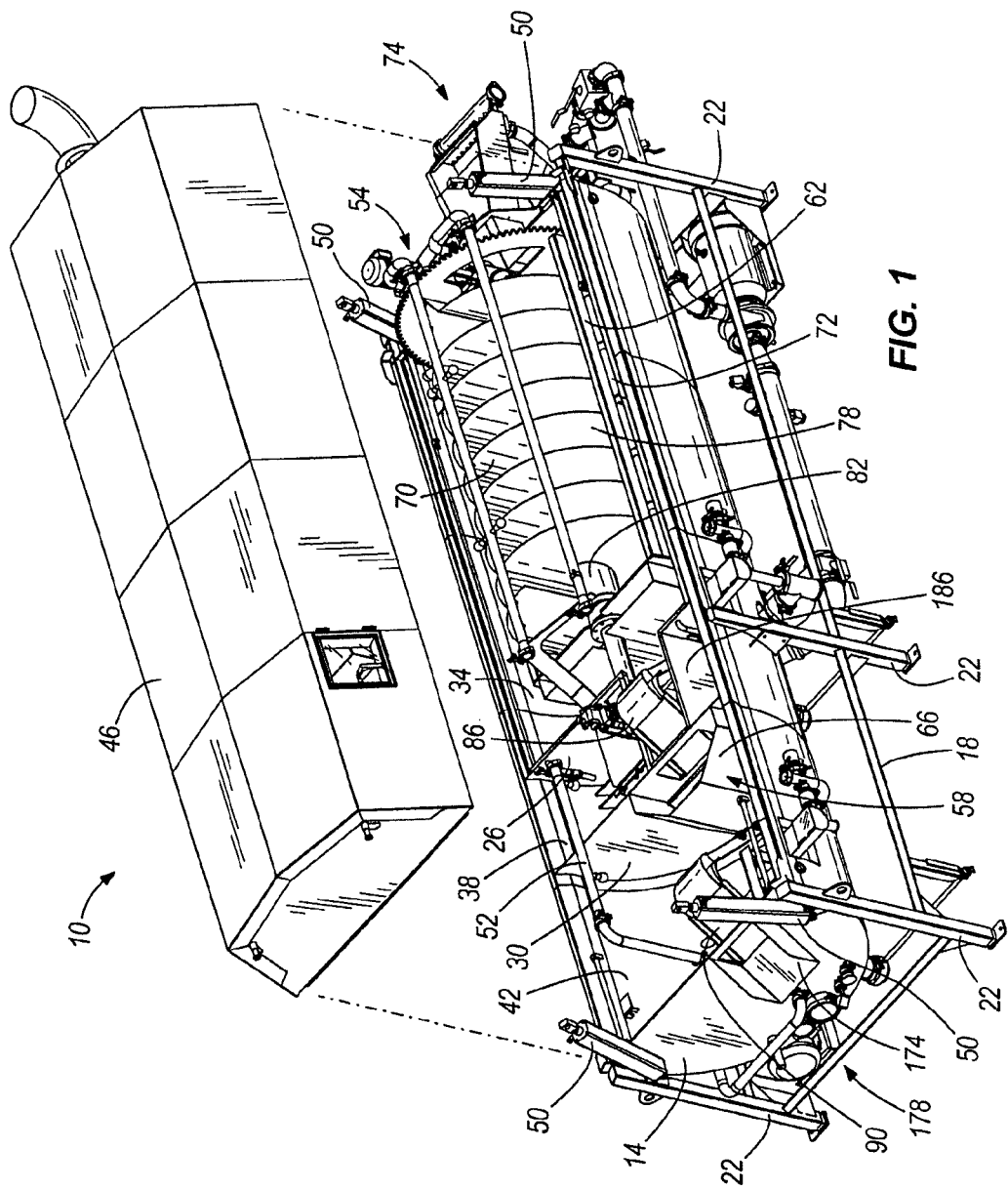
FIG. 1 is a perspective view of a food processing system according to one embodiment of invention.

FIG. 1 illustrates a food processing system 10 according to one embodiment of the invention. In the illustrated construction, the food processing system 10 includes an open-top tank 14 that is supported by a frame 18 having legs 22 that rest upon a support surface (e.g., the floor) and space the tank 14 above the support surface. The illustrated tank 14 includes two dividers 26, 30 to divide the tank into three compartments 34, 38, 42, or sections, suitable for processing (e.g., cooking, cooling, etc.) food product. In other embodiments, the tank 14 may include fewer or more dividers to divide the tank 14 into fewer or more compartments. In further embodiments, the tank 14 may be a single compartment tank.

An elongated vaulted cover 46 mates with and covers the tank 14 to substantially enclose the tank 14. The cover 46 is generally attached to the tank 14 in such a manner as to allow the cover 46 to move relative to the tank 14 and permit access to the compartments 34, 38, 42. In the illustrated embodiment, lift cylinders 50 extend between the tank 14 and the cover 46 to lift the cover 46 relative to the tank 14 and permit access to the compartments 34, 38, 42. In other embodiments, the cover 46 may be hingedly connected to the tank 14 so the cover 46 swings away from the tank 14 to permit access to the compartments 34, 38, 42. The tank 14 and the cover 46 may be composed of stainless steel or other suitable materials for food processing applications. A pipe header 52 is positioned in the tank 14 under the cover 46 to facilitate cleaning of the food processing system 10.

As shown in FIG. 1, the illustrated food processing system 10 is a cooker-cooler system. In other constructions (not shown), the system 10 may be another type of food processing system, such as, for example, a cooker, a cooler, a transport mechanism, etc., or even a non-food processing system.

In the illustrated construction, the food processing system 10 includes a cooker mechanism 54 positioned within the first compartment 34 to cook food product and a cooler mechanism 58 positioned within the third compartment 42 to cool the food product after cooking. The cooker mechanism 54 uses a hot heat transfer medium, or cooking fluid, to cook the food product, while the cooler mechanism 58 uses a cold heat transfer medium, or cooling fluid, to cool the food product. The hot heat transfer medium comprises any number of liquids, non-liquids, or a combination liquid/non-liquid medium, including, but not limited to, water, steam, heated gas or vapor, water and steam, water and water vapor, or the like. Similarly, the cool heat transfer medium may include a cool liquid medium, such as water. The second compartment 38 is positioned between the first and third compartments 34, 42 to help separate and insulate the compartments 34, 42 from one another. The second compartment 38 may be filled with, for example, ambient air. In some embodiments, the second compartment 38 may be omitted and an insulated divider may be positioned between the first and third compartments 34, 42.

In the illustrated embodiment, the cooker mechanism 54 includes a rotary screw blancher 62 and the cooler mechanism 58 includes a hopper 66 to flash-cool food product. In other embodiments, the food processing system 10 may include a rotary drum blancher or another suitable cooker mechanism to cook the food product. Additionally or alternatively, the food processing system 10 may include a different cooler mechanism to cool the food product. In further embodiments, the food processing system 10 may include multiple cooker and/or cooler mechanisms located in a series of compartments to incrementally cook or cool the food product, respectively.

The illustrated rotary screw blancher 62 includes an auger 70, or helical screw, disposed within the first compartment 34. The auger 70 rotates within an open-top screen 72 of the rotary screw blancher 62 to advance food product from an inlet end 74 of the tank 14 toward the second compartment 38. The auger 70 includes a plurality of axially spaced apart and interconnected flights 78 that spiral about a shaft 82 along substantially the entire length of the compartment 34. As the auger 70 rotates, the flights 78 move the food product through the heat transfer medium to cook the food product. One example of such a rotary screw blancher is found in U.S. Patent Application Publication No. 2007/0044666, titled "Rotary Screw Blancher," the entire contents of which is hereby incorporated by reference.

Figure 2:
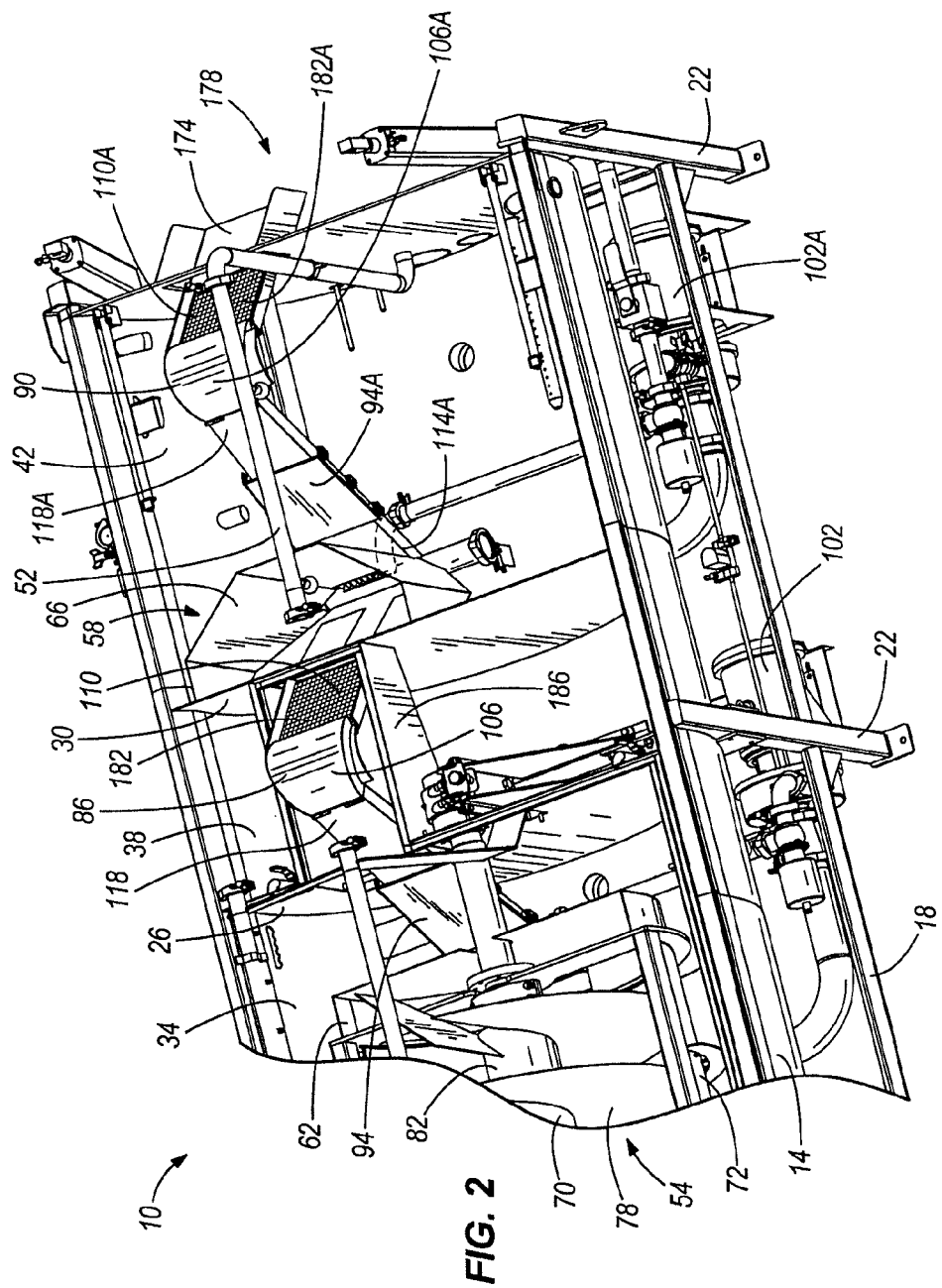
FIG. 2 is a top perspective view of a portion of the food processing system shown in FIG. 1.
Figure 3:
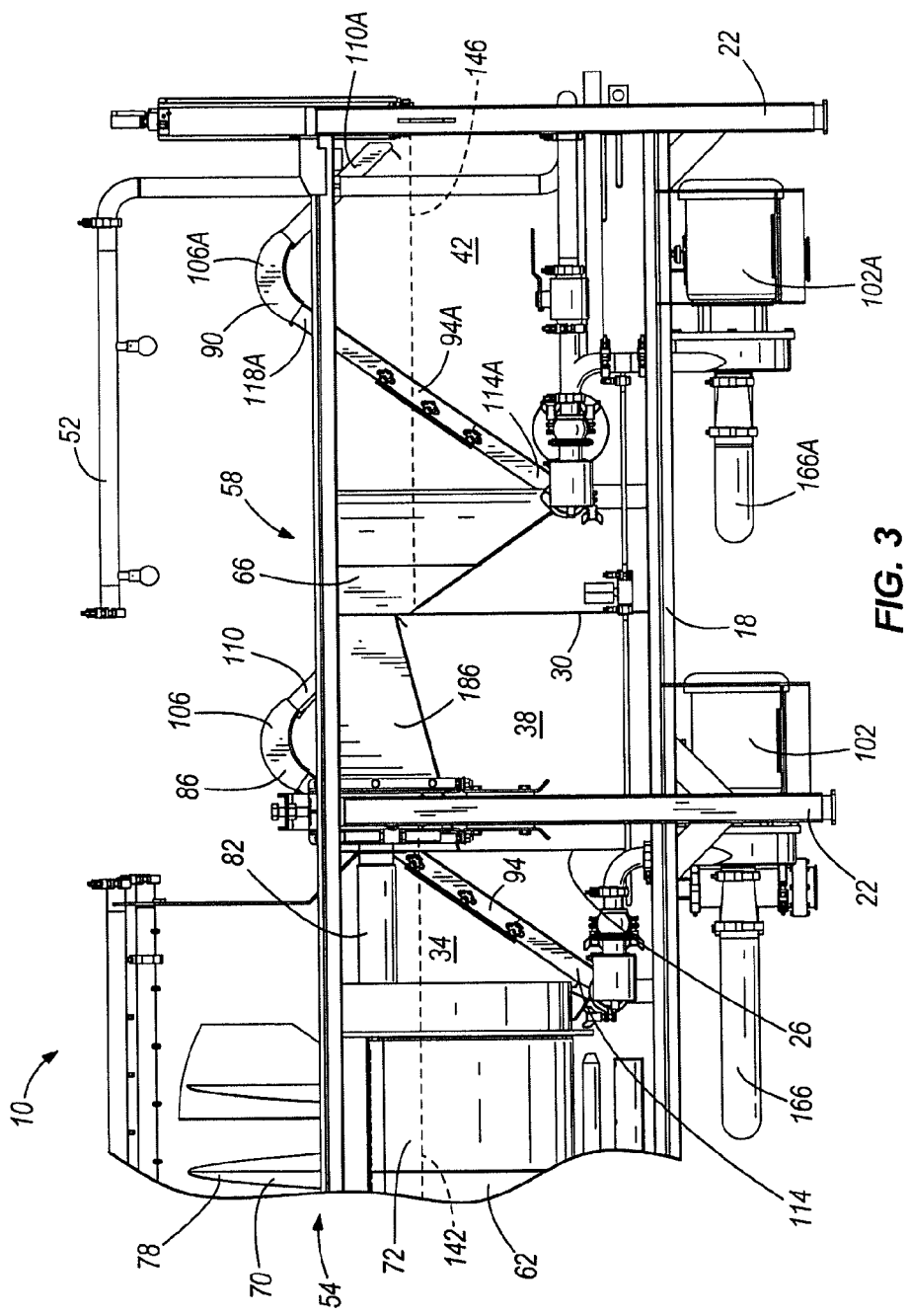
FIG. 3 is a side view of the portion of the food processing system shown in FIG. 2 with portions of a tank removed.

As shown in FIGS. 1-3, the food processing system 10 also includes a first transfer mechanism 86 and a second transfer mechanism 90. The first transfer mechanism 86 transfers food product from the first compartment 34 of the tank 14 to the third compartment 42, and the second transfer mechanism 90 transfers the food products from the third compartment 42 out of the food processing system 10. That is, the first transfer mechanism 86 transfers hot, cooked food product from the cooker mechanism 54 to the cooler mechanism 58, while the second transfer mechanism 90 transfers cool, cooked food product from the cooler mechanism 58 to, for example, a packaging system. In embodiments where the food processing system 10 includes fewer compartments (e.g., only a cooker mechanism or only a cooler mechanism), the food processing system 10 may only include a single transfer mechanism to transfer the food product out of the food processing system 10. In embodiments where the food processing system 10 includes more compartments (e.g., multiple cooker and/or cooler mechanisms), the food processing system 10 may include more transfer mechanisms to transfer the food product between the additional compartments. In other embodiments, the transfer mechanisms 86, 90 may be used in non-food processing applications to transfer other types of products.

In the illustrated embodiment, the first transfer mechanism 86 is in communication with a discharge of the rotary screw blancher 62 to receive food product from the rotary blancher 62. The transfer mechanism 86 lifts the food product past the first divider 26 and the second compartment 38 and discharges the food product into the third compartment 42. More particularly, the first transfer mechanism 86 discharges the food product into the hopper 66 in the third compartment 42, which is filled with the cold heat transfer medium to flash-cool the food product. The illustrated second transfer mechanism 90 is in communication with the hopper 66 to receive the food product from the first transfer mechanism 86 after the food product has been cooked and cooled. The second transfer mechanism 90 lifts the food product within the third compartment 42 and discharges the food product out of the tank 14 for packaging. In some embodiments, the second transfer mechanism 90 may discharge the food product onto, for example, a cooling or drying rack, a transport device such as a conveyor belt or Ferris wheel-type apparatus, or another food processing system separate from the illustrated food processing system 10.

Figure 4:
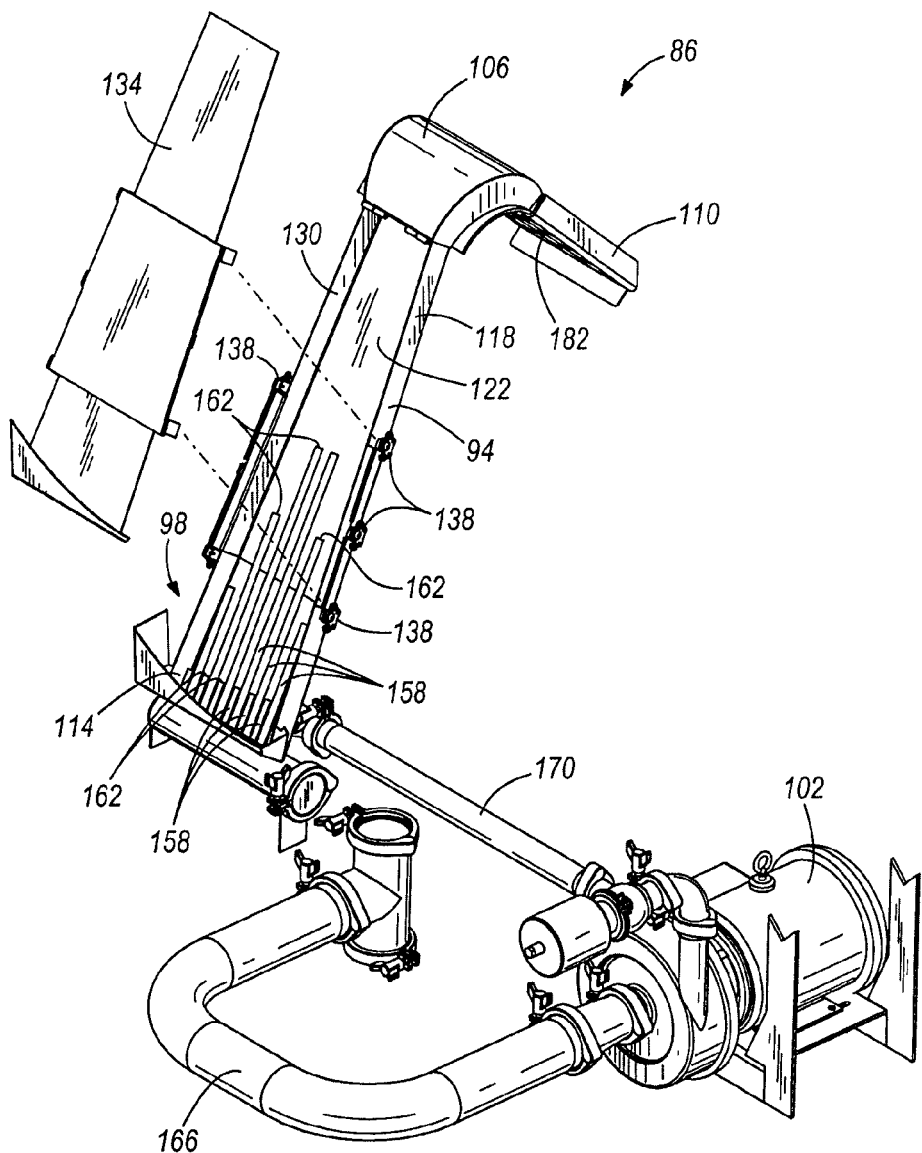
FIG. 4 is a perspective view of a transfer mechanism for use with the food processing system shown in FIG. 1.
Figure 5:
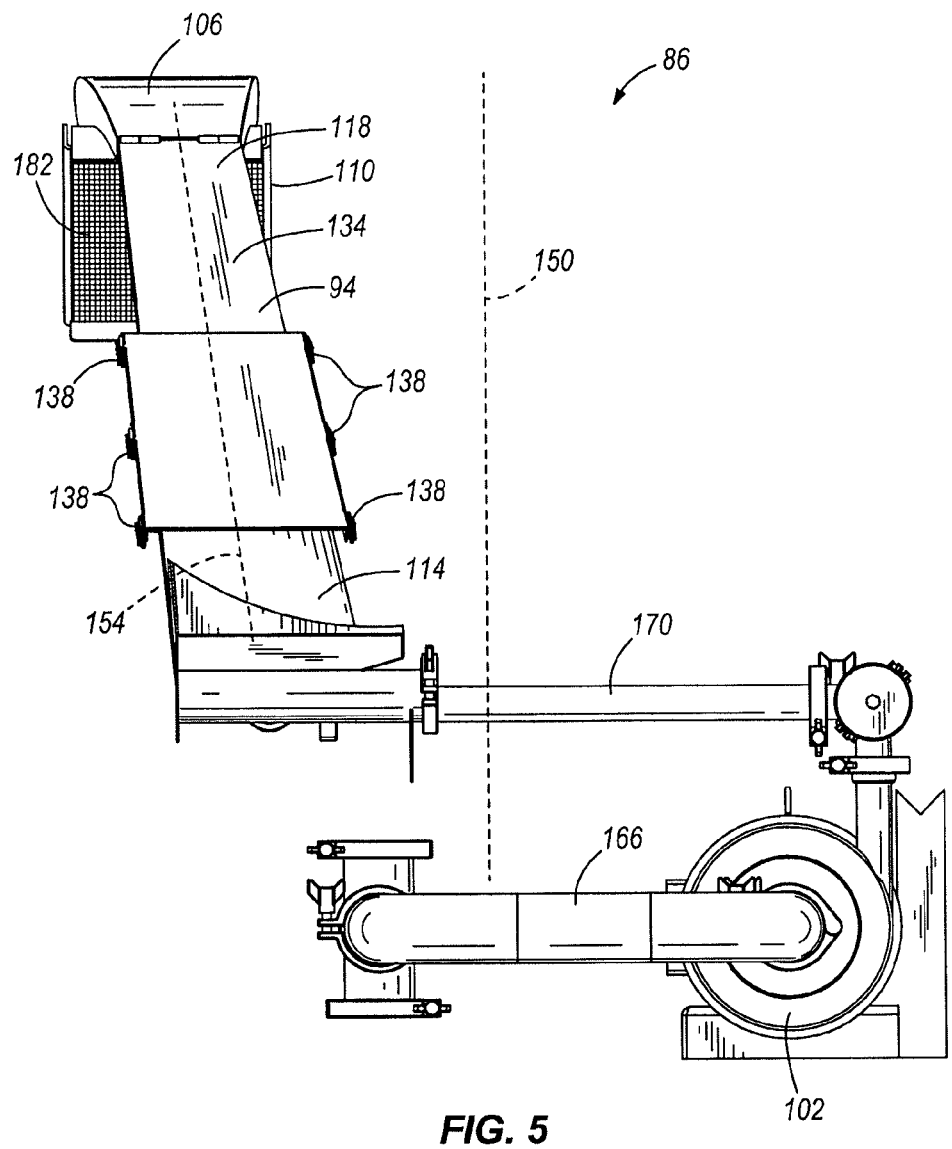
FIG. 5 is a front view of the transfer mechanism shown in FIG. 4.

FIGS. 4 and 5 illustrate the first transfer mechanism 86 in more detail. Although the transfer mechanism 86 shown in FIGS. 4 and 5 is described as being the first transfer mechanism 86, the illustrated transfer mechanism 86 may alternatively be the second transfer mechanism 90. Except as specified below, the second transfer mechanism 90 is substantially similar to the first transfer mechanism 86. Accordingly, like parts of the second transfer mechanism 90 have been given the same reference numbers plus an "A" annotation in FIGS. 1-3.

As shown in FIGS. 4 and 5, the transfer mechanism 86 includes a conduit 94, a fluid discharge 98, a pressurized fluid source 102, a convex guide member 106, and a dewatering member 110. The conduit 94 includes an inlet, or first end, portion 114 in communication with the rotary screw blancher 62 and an outlet, or second end, portion 118 in communication with the convex guide member 106. The inlet portion 114A of the second transfer mechanism 90 is in communication with the hopper 66 in the third compartment 42 of the tank 14. The conduit 94 receives food product from the rotary screw blancher 62 (or the hopper 66) and directs the food product toward the outlet portion 118 of the conduit 94 using the fluid discharge 98 and the pressurized fluid source 102, as further discussed below.

The illustrated conduit 94 also includes a lower wall 122, two side walls 126, 130, and an upper wall 134. The lower and side walls 122, 126, 130 are integrally formed as a three sided member from, for example, sheet stock. The upper wall 134, or cover, is removably coupled to the side walls 126, 130 with clamps 138 to permit easy access to the interior of the conduit 94. Such an arrangement facilitates cleaning and maintenance of the conduit 94. In the illustrated embodiment, the walls 122, 126, 130, 134 are arranged such that the conduit 94 has a generally rectangular cross-sectional shape that tapers from the inlet portion 114 to the outlet portion 118. That is, the width of the conduit 94 is greater at the inlet portion 114 than at the outlet portion 118. In other embodiments, the conduit 94 may have other cross-sectional shapes such as, for example, square, circular, elliptical, or the like and/or the conduit 94 may have a uniform width along the length of the conduit 94.

In the illustrated embodiment, the conduit 94 is inclined relative to the tank 14 such that the outlet portion 118 is positioned above and downstream of the inlet portion 114. As shown in FIG. 3, the outlet portion 118 is positioned above a fluid level 142 (e.g., the level of the liquid hot heat transfer medium) in the first compartment 34, while the inlet portion 114 is positioned below the fluid level 142. Similarly, the outlet portion 118A of the second transfer mechanism 90 is positioned above a fluid level 146 (e.g., the level of the liquid cold heat transfer medium) in the third compartment 42, while the inlet portion 114A of the second transfer mechanism 90 is positioned below the fluid level 146. In the illustrated embodiment, the fluid levels 142, 146 in the first and third compartments 34, 42 are at substantially the same height. In other embodiments, the fluid levels 142, 146 may be at substantially different heights relative to one another. For example, the fluid level 142 in the first compartment 34 may be substantially lower for steam blanching food product.

As shown in FIG. 5, the conduit 94 is also angled relative to a vertical, central longitudinal plane 150 extending through the tank 14. In the illustrated embodiment, the conduit 94 defines a central axis 154 extending from the inlet portion 114 to the outlet portion 118. The illustrated axis 154 is offset from and oblique relative to the central plane 150 so that food product is moved laterally relative to the plane 150 as the food product travels through the conduit 94. Such a construction helps the transfer mechanism 86 avoid any existing obstacles that may be present within the tank 14. For example, in the illustrated embodiment, the conduit 94 is angled such that the outlet portion 118 of the conduit 94 is further from the central plane 150 than the inlet portion 114 to help avoid the shaft 82 of the auger 70, as shown in FIG. 2. In other embodiments, the inlet portion 114 of the conduit 94 may be further from the central plane 150 than the outlet portion 118 such that the conduit 94 is angled in an opposite direction. In some embodiments, such as the embodiment of FIGS. 6 and 7, the central axis 154, and thereby the conduit 94, may be substantially parallel to the central plane 150 of the tank 14. In further embodiments, the conduit 94 may be positioned such that the axis 154 crosses over or lies within the plane 150.

Figure 6:
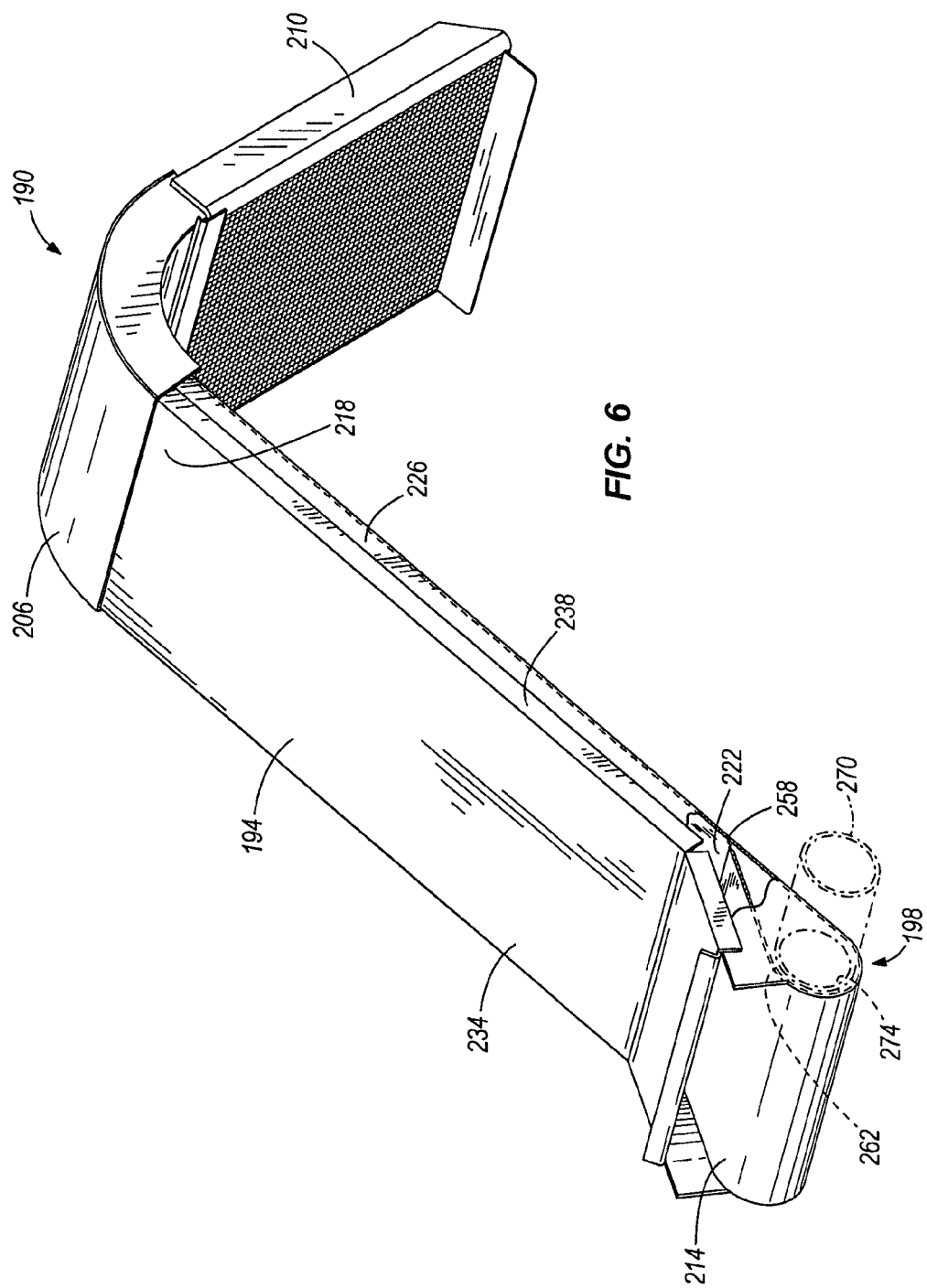
FIG. 6 is a perspective view of another transfer mechanism for use with the food processing system shown in FIG. 1.
Figure 7:
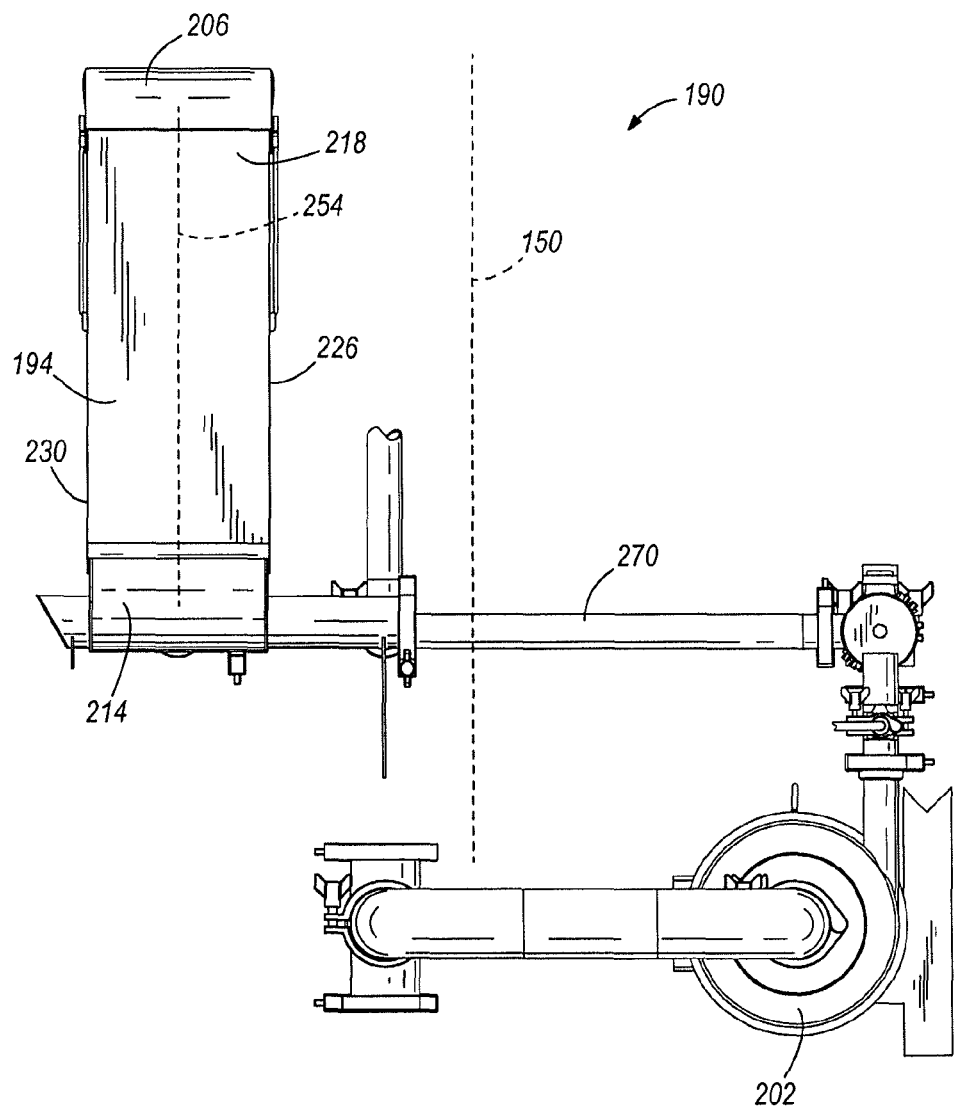
FIG. 7 is a front view of the transfer mechanism shown in FIG. 6.
Figure 8:
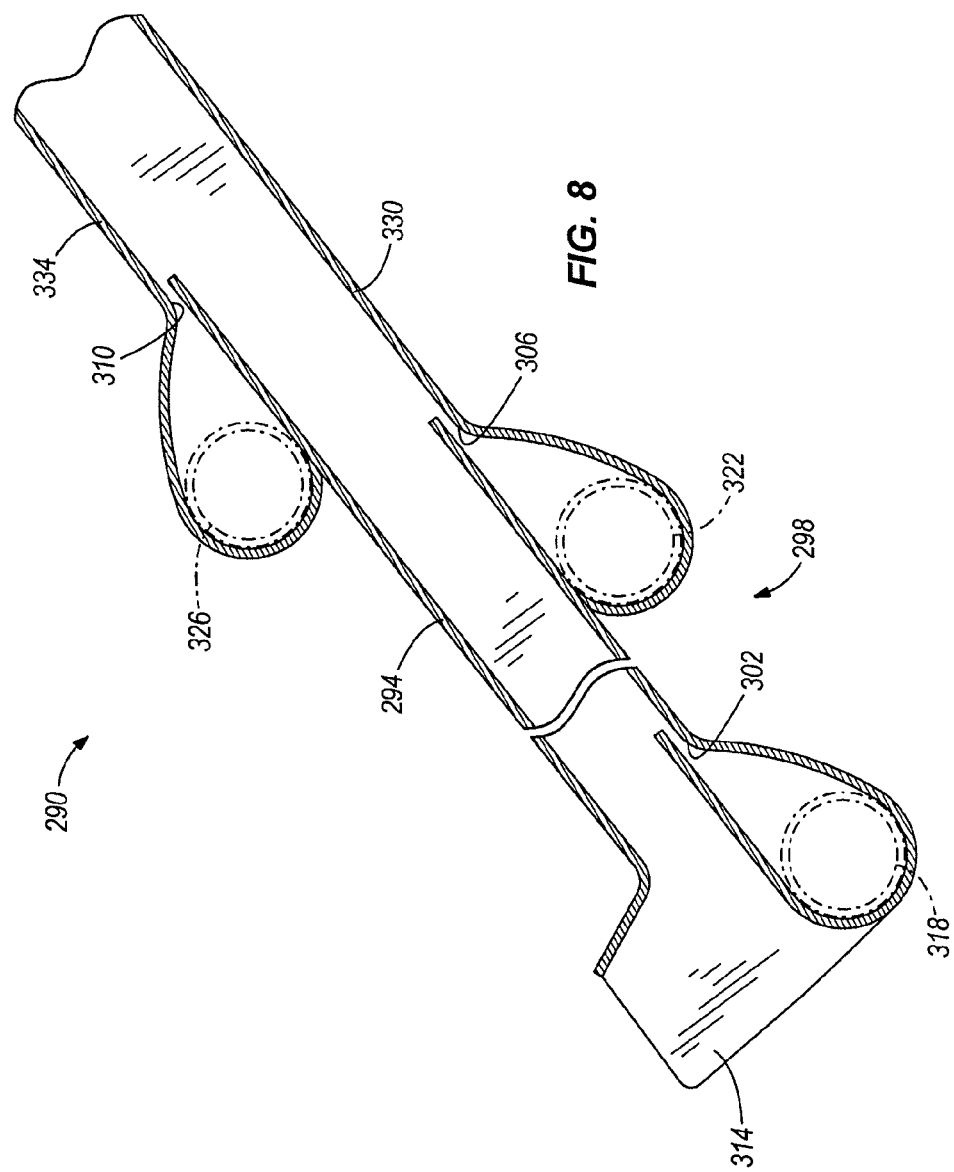
FIG. 8 is a cross-sectional view of yet another transfer mechanism for use with the food processing system shown in FIG. 1.

The fluid discharge 98 is positioned within the conduit 94 adjacent to the inlet portion 114. In the illustrated embodiment, the fluid discharge 98 includes a plurality of nozzles 158 to direct a flow of pressurized fluid from the fluid source 102 upwardly through the conduit 94. Each nozzle 158 defines an outlet 162 positioned between the inlet portion 114 and the outlet portion 118 of the conduit 94. In the illustrated embodiment, the outlets 162 of the nozzles 158 are staggered relative to one another within the conduit 94 such that some of the nozzles 158 extend further upwardly into the conduit 94 than others. The nozzles 158 help focus, and thereby pressurize, fluid from the fluid source 102, ensuring the fluid has sufficient flow strength when it exits the outlets 162 to push food product upwardly through the conduit 94 to the outlet portion 118. In other embodiments, the fluid discharge 98 can include other focusing devices (e.g., one or more slots, as shown in FIGS. 6-8) suitable for focusing and pressurizing fluid.

The pressurized fluid source 102 is in communication with the fluid discharge 98 to propel a fluid through the nozzles 158. In the illustrated embodiment, the fluid source 102 is a pump and includes an inlet pipe 166 and an outlet pipe 170. In other embodiments, the pressurized fluid source 102 may be a different device operable to propel a fluid through the nozzles 158. As shown in FIGS. 2 and 3, the pump 102 is positioned beneath the tank 14. The pump 102 circulates a fluid from the inlet pipe 166, through the outlet pipe 170, and to the fluid discharge 98. The fluid may be, for example, heat transfer medium from one of the compartments 34, 42 of the tank 14 or may be fluid from a dedicated source that is separate from the tank 14.

In some embodiments, the inlet pipe 166 is in communication with the first compartment 34 of the tank 14 to direct heat transfer medium from the first compartment 34 into the pump 102. The inlet pipe 166A of the second transfer mechanism 90 is in communication with the third compartment 42 of the tank 14 to direct heat transfer medium from the third compartment 42 into the pump 102A. The heat transfer medium is propelled by the pump 102 through the outlet pipe 170 and out of the fluid discharge 98. The heat transfer medium is thereby circulated between the pump 102, the conduit 94, and the first compartment 34 (or the third compartment 42) such that the fluid level 142 (or the fluid level 146) remains generally constant within the first compartment 34 (or the third compartment 42).

In other embodiments, the inlet pipe 166 is in communication with a dedicated fluid source to direct fluid from the dedicated source into the pump 102. The fluid is propelled by the pump 102 through the outlet pipe 170, out of the fluid discharge 98, and eventually reaches the tank 14. In such embodiments, the fluid in the dedicated source may have generally the same composition as the heat transfer medium such that the fluid supplements the heat transfer medium for cooking or cooling. A heater (or a chiller) may be thermally coupled to the inlet pipe 166 or the outlet pipe 170 to help heat (or cool) the fluid to an appropriate temperature before reaching the tank 14. In addition, a fluid level sensor may be positioned within the tank 14 to monitor if the fluid level (which is now a combination of the heat transfer medium and the fluid from the dedicated source) rises or falls too much.

The fluid discharge 98 and the pressurized fluid source 102 generate a vacuum force at the inlet portion 114 of the conduit 94. The vacuum force helps draw food product into the inlet portion 114 of the conduit 94 such that the fluid being discharged by the nozzles 158 moves the food product toward the outlet portion 118 of the conduit 94. The vacuum force generated in the first transfer mechanism 86 helps pull the food product out of the rotary screw blancher 62 and into the conduit 94. The vacuum force generated in the second transfer mechanism 90 helps pull the food product toward the bottom of the hopper 66 and into the conduit 94A. Once the food product enters the conduit 94, the pressurized fluid exiting the fluid discharge 98 lifts the food product against the force of gravity through the conduit 94 and toward the convex guide member 106.

Referring to FIGS. 4 and 5, the convex guide member 106 is an arcuate conduit portion positioned adjacent to and in communication with the outlet portion 118 of the conduit 94. The convex guide member 106 receives food product and fluid from the conduit 94 and redirects the food product and the fluid downwardly toward the dewatering member 110. The illustrated convex guide member 106 is configured such that the conduit 94, the convex guide member 106, and the dewatering member 110 form a generally inverted V-shape, as shown in FIG. 3. In the illustrated embodiment, the inverted V-shape is formed at an acute angle between the conduit 94 and the dewatering member 110. In other embodiments, the inverted V-shape may be formed at a right angle or an obtuse angle between the conduit 94 and the dewatering member 110.

As shown in FIGS. 4 and 5, the dewatering member 110 is coupled to and in communication with the convex guide member 106. The illustrated dewatering member 110 separates the food product from the fluid and directs the food product into the hopper 66 in the third compartment 42. The dewatering member 110A of the second transfer mechanism 90 directs the food product onto a discharge chute 174 (FIGS. 1 and 2) at an outlet end 178 of the tank 14. In the illustrated embodiment, the dewatering member 110 includes a screen 182. The screen 182 is inclined to define a ramp for food product to tumble (e.g., slide and/or roll) downwardly along. For example, the illustrated screen 182 is inclined to define a surface substantially parallel to the direction of flow of the food product exiting the convex guide member 106, reducing turbulence and disruption of the flow from the convex guide member 106 to the dewatering member 110.

The screen 182 also defines openings for the fluid to fall through under the influence of gravity. The openings are smaller than the food product so that, as the fluid falls through the screen, the food product is retained on the screen 182 and continues toward the hopper 66 (or the discharge chute 174). In some embodiments, a portion of the conduit 94 and/or the convex guide member 106 may also be a screen to facilitate dewatering the food product. As shown in FIGS. 2 and 3, the screen 182 of the first transfer mechanism 86 is positioned substantially above a tray 186 in the second compartment 38. The tray 186 catches the fluid that falls through the screen 182 and directs the fluid into the first compartment 34. The screen 182A of the second transfer mechanism 90 is positioned substantially above the third compartment 42. The fluid thereby falls through the screen 182A and directly into the third compartment 42. Such arrangements help maintain the different heat transfer mediums into their appropriate compartments 34, 42. That is, the hot heat transfer medium and/or the hot fluid is kept in the first compartment 34, while the cold heat transfer medium and/or the cold fluid is kept in the third compartment 42.

In operation, uncooked food product is inserted into the food processing system 10 through the inlet end 74 of the tank 14. Referring to FIG. 1, the auger 70 of the rotary screw blancher 62 is rotated to move the uncooked food product through the hot heat transfer medium in the first compartment 34. As the food product moves through the heat transfer medium, the food product becomes cooked. The food product travels through the first compartment 34 until reaching the discharge of the rotary screw blancher 62. At the discharge, the vacuum force generated by the fluid discharge 98 and the pump 102 of the first transfer mechanism 86 pulls the cooked food product into the conduit 94 of the transfer mechanism 86.

Referring to FIGS. 2 and 3, once the food product is pulled into the conduit 94, the pressurized fluid exiting the nozzles 158 lifts and pushes the food product against the force of gravity to move the food product toward the convex guide member 106. The food product and the fluid flow through the convex guide member 106 and onto the dewatering member 110. At this time, the food product tumbles down the dewatering member 110, while the fluid falls through the screen 182 of the dewatering member 110 and onto the tray 186. The tray 186 directs the fluid back into the first compartment 34 where the fluid can be used to help cook more food product in the rotary screw blancher 62.

The food product falls out of the dewatering member 110 of the first transfer mechanism 86 and into the hopper 66 in the third compartment 42. The food product sinks or is pulled by the vacuum force generated by the second transfer mechanism 90 toward the bottom of the hopper 66. As the food products moves toward the bottom of the hopper 66, the cold heat transfer medium within the hopper 66 rapidly cools the food product (e.g., from about 200° F. to about 70° to 80° F.). The food product is then pulled into the conduit 94 of the second transfer mechanism 90 by the vacuum force generated by the fluid discharge and the pump 102A.

Similar to the first transfer mechanism 86, once the food product is pulled into the conduit 94A of the second transfer mechanism 90, the pressurized fluid exiting the nozzles lifts and pushes the food product against the force of gravity to move the food product toward the convex guide 106A. The food product and the fluid flow through the convex guide 106A and onto the dewatering member 110A. At this time, the food product tumbles down the dewatering member 110A and is discharged from the food processing system 10 via the discharge chute 174. The discharge chute 174 then directs the cooked and cooled food product to a packaging system or another food processing system. In the meantime, the fluid falls through the screen 182A of the dewatering member 110A back into the third compartment 42 where the fluid can be used to help cool more food product in the hopper 66.

FIGS. 6 and 7 illustrate another embodiment of a transfer mechanism 190 for use in the food processing system 10. The illustrated transfer mechanism 190 is similar to the first and second transfer mechanisms 86, 90 discussed above with reference to FIGS. 1-5, and like parts have been given the same reference numbers plus 100. Reference is hereby made to the description of the transfer mechanisms 86, 90 above for details of the structures and operation, as well as alternatives to the structures and operation, of the transfer mechanism 190 not specifically discussed herein.

The illustrated transfer mechanism 190 includes a conduit 194, a fluid discharge 198, a pressurized fluid source 202 (FIG. 7), a convex guide member 206, and a dewatering member 210. The conduit 194 includes a lower wall 222 and two side walls 226, 230 integrally formed as a three-sided member. An upper wall 234, or cover, is removably coupled to the side walls 226, 230. In the illustrated embodiment, the upper wall 234 includes lips 238 extending over portions of the side walls 226, 230 and is partially captured under the convex guide member 206 to help retain the upper wall 234 in place. In other embodiments, the upper wall 234 may be coupled to the side walls 226, 230 with clamps, fasteners, or the like. Similar to the conduits 94, 94A of the transfer mechanisms 86, 90 discussed above, the walls 222, 226, 230, 234 of the illustrated conduit 194 are arranged such that the conduit 194 has a generally rectangular cross-section. In the illustrated embodiment, the width of the conduit 194 is substantially constant from an inlet portion 214 of the conduit 194 to an outlet portion 218.

As shown in FIG. 7, the conduit defines a central axis 254 extending from the inlet portion 214 to the outlet portion 218. The illustrated axis, and thereby the conduit 194, is offset from and substantially parallel to the central longitudinal plane 150 extending through the tank 14 of the food processing system 10. In other embodiments, the axis 254 may be oblique relative to the plane 150 such that the transfer mechanism 194 also directs food product laterally relative to the tank 14 in a manner similar to the transfer mechanisms 86, 90 discussed above. In further embodiments, the conduit 194 may be aligned with the plane 150 such that the axis 254 substantially overlies the plane 150.

As shown in FIG. 6, the fluid discharge includes a slot 258 positioned adjacent to the inlet portion 214 of the conduit 294. The illustrated slot 258 is formed by doubling over a portion of the lower wall 222 to form a generally teardrop-shaped opening 262. Similar to the nozzles 158 discussed above, the slot 258 helps focus, and thereby pressurize, fluid from the fluid source 202 (FIG. 7), ensuring the fluid has sufficient flow strength to push food product upwardly through the conduit 194 to the outlet portion 218. While the nozzles 158 provide discrete points at which pressurized fluid is discharged into the conduit 94, the slot 258 provides a continuous discharge of fluid along the entire width of the conduit 194. In the illustrated embodiment, the slot 258 has a height of approximately ⅛" to help focus and pressurize the fluid. In other embodiments, the height of the slot 258 may be relatively larger or smaller (e.g., from about ³⁄₁₆" to about ¹⁄₁₆") to allow more or less fluid to simultaneously flow out of the slot 258. In still other embodiments, the size of the slot 258 may be even larger or smaller depending upon the desired capacity of the transfer mechanism 190.

An outlet pipe 270 of the pressurized fluid source 202 (e.g., a pump) extends through an enlarged portion 274 of the teardrop-shaped opening 262. The outlet pipe 270 directs fluid from the pump 202, through the outlet pipe 270, and out of the slot 258. Similar to the transfer mechanisms 86, 90 discussed above, the fluid discharge 198 and the pump 202 generate a vacuum force at the inlet portion 214 of the conduit 194. The vacuum force helps draw food product into the inlet portion 214 such that the pressurized fluid exiting the slot 258 can move the food product toward the convex guide member 206.

In some embodiments, the fluid discharge 198 may include two or more slots positioned along the conduit 194. For example, FIG. 8 illustrates a conduit 294 of a fluid transfer mechanism 290 according to another embodiment of the invention. In the illustrated embodiment, a fluid discharge 298 of the transfer mechanism 290 includes three slots 302, 306, 310 spaced apart along the conduit 294 between an inlet portion 314 and an outlet portion. Each slot 302, 306, 310 is substantially similar to the slot 258 discussed above and is in communication with a separate outlet pipe 318, 322, 326 from a pressurized fluid source.

As shown in FIG. 8, the first slot 302 is directly adjacent to the inlet portion 314 of the conduit 294 (similar to the slot 258 discussed above), the second slot 306 is formed on a lower wall 330 of the conduit 294 downstream of the first slot 302, and the third slot 310 is formed on an upper wall 334 of the conduit 294 downstream of the second slot 306. In other embodiments, the relative positioning of the slots 302, 306, 310 may be altered. For example, all of the slots 302, 306, 310 may be positioned along a single wall of the conduit 294 (e.g., either the lower wall 330 or the upper wall 334), or the slots 302, 306, 310 may be positioned on the conduit 294 alternating between the lower wall 330 and the upper wall 334. In further embodiments, the fluid discharge 298 may only include two slots either positioned on the same wall of the conduit 294 or on opposite walls. For example, the fluid discharge 298 may include the first and second slots 302, 306 or may include the first and third slots 302, 310.

The illustrated slots 302, 306, 310 help propel food product through the conduit 294 over a longer distance. For example, while the single slot embodiment discussed above is operable to lift food product between about 11" and 18", or higher, above the fluid level 142, 146 in the tank 14, two or more slots may be employed to lift the food product even higher above the fluid level 142, 146. Additional slots may be formed in a conduit, as necessary, to lift food product to a desired height above the fluid level 142, 146.

Figure 9:
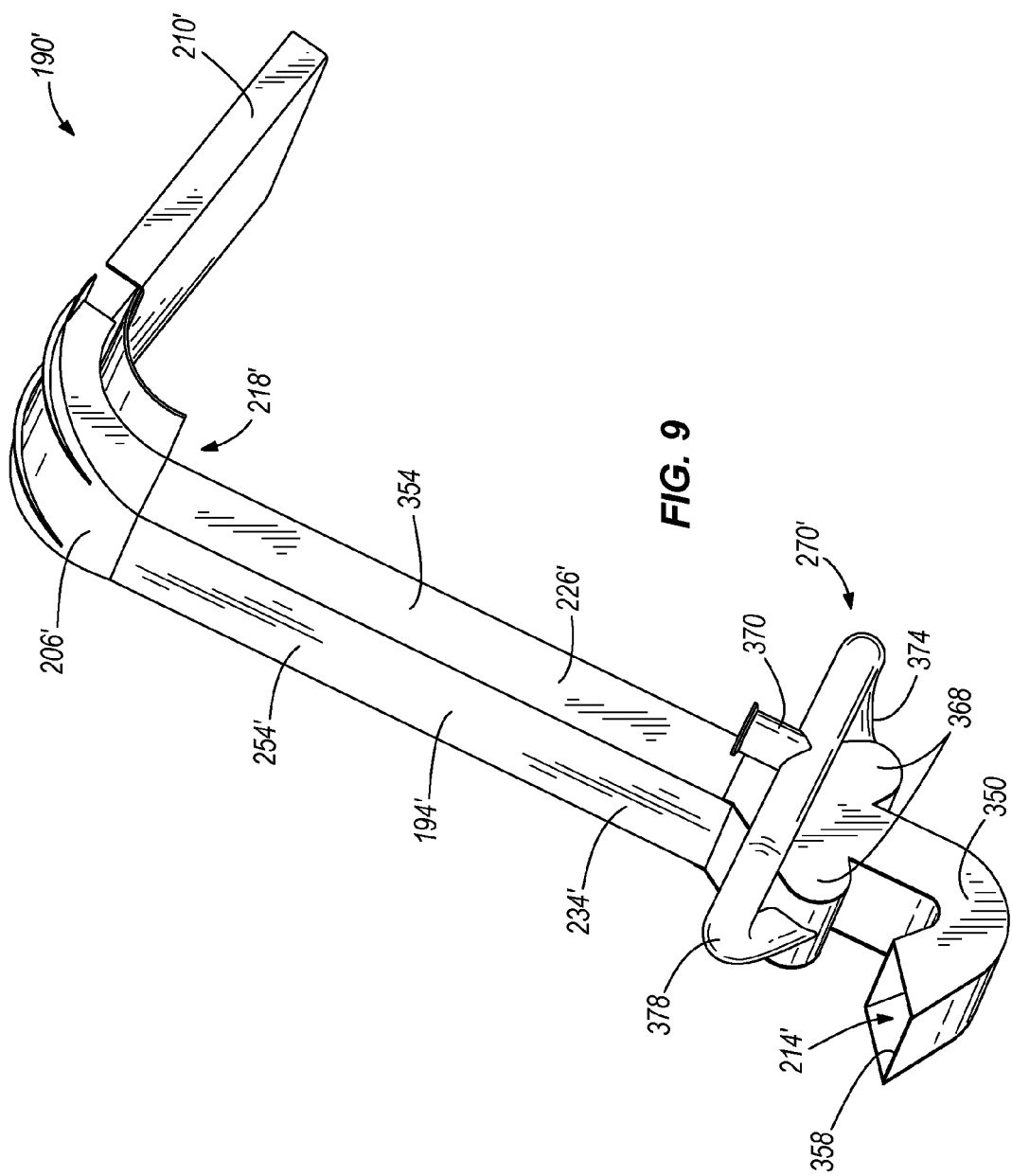
FIG. 9 is a perspective view of a further transfer mechanism.
Figure 10:
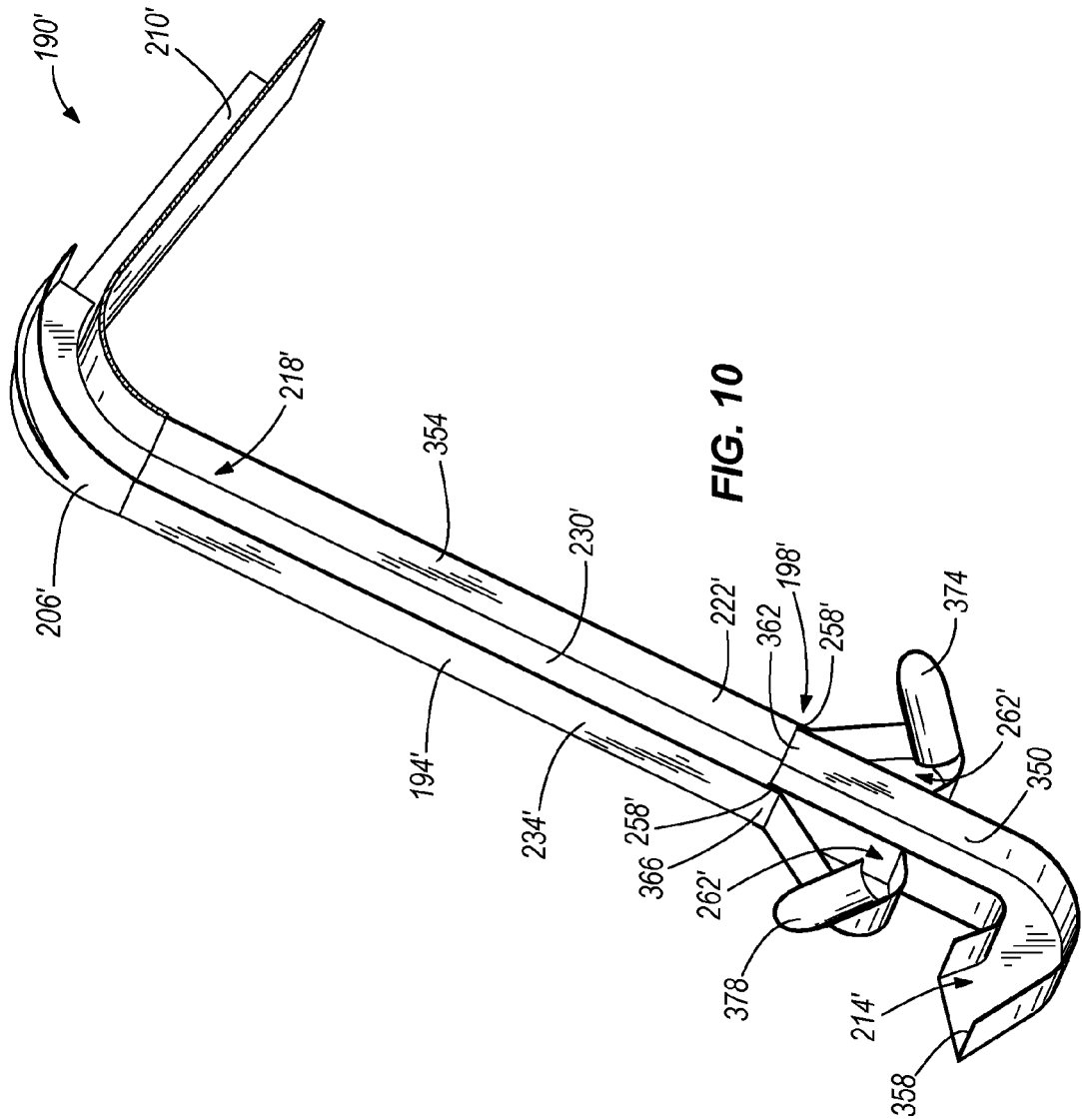
FIG. 10 is a cross-sectional view of the transfer mechanism shown in FIG. 9.
Figure 11:
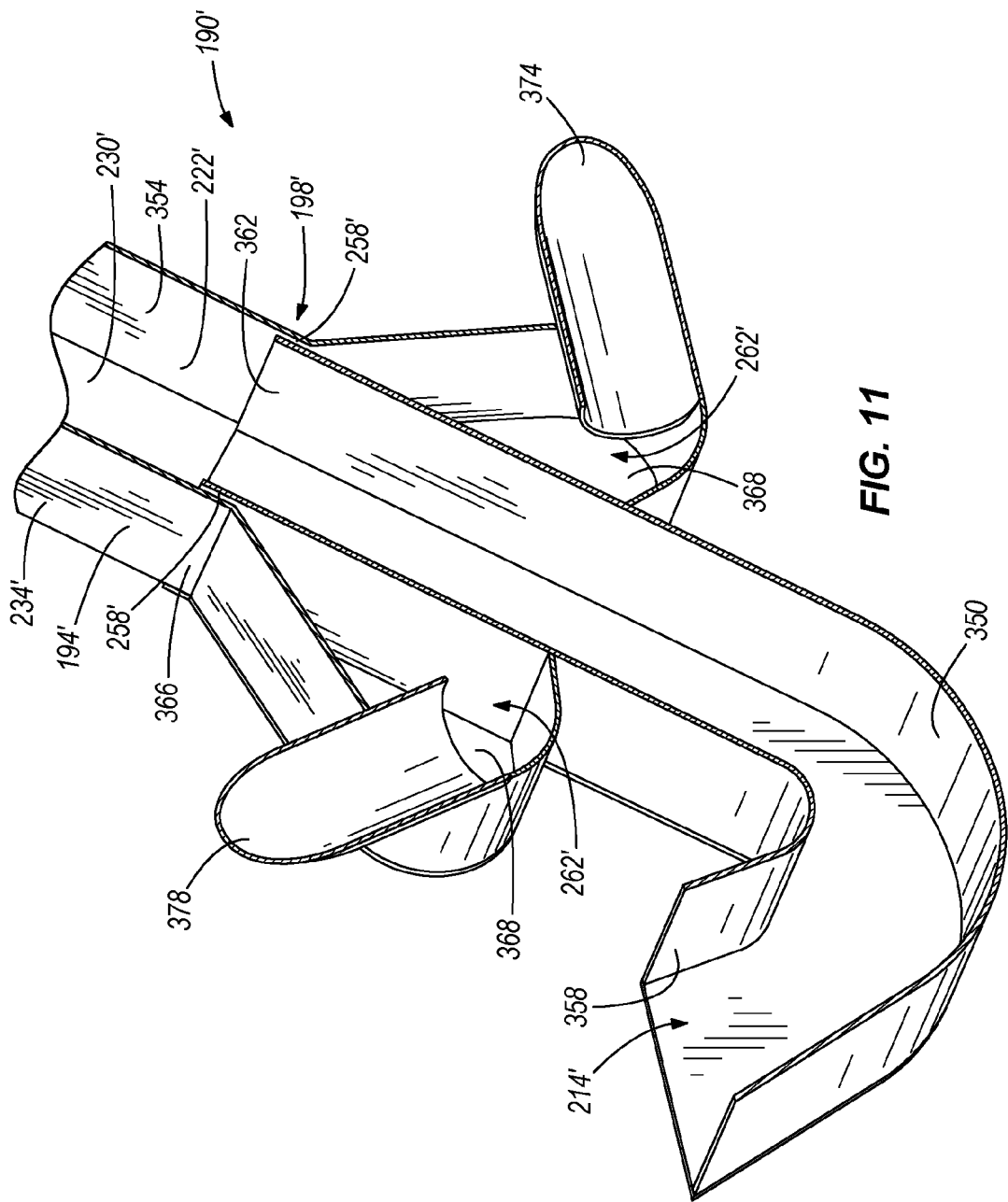
FIG. 11 is an enlarged cross-sectional view of a portion of the transfer mechanism shown in FIG. 11.

FIGS. 9-11 illustrate a further alternative construction of a transfer mechanism 190'. The illustrated transfer mechanism 190' is similar to the transfer mechanisms 190, 290 discussed above with respect to FIGS. 6-8 and/or to the first and second transfer mechanisms 86, 90 discussed above with reference to FIGS. 1-5. Like parts have been given the same reference numbers "'". Reference is hereby made to the description of the transfer mechanisms 86, 90, 190, 290 above for details of the structures and operation, as well as alternatives to the structures and operation, of the transfer mechanism 190' not specifically discussed herein.

The transfer mechanism 190' may be used with the food processing system 10 shown in FIG. 1 or with other types of food processing systems, such as, for example, a cooker, a cooler, a transport mechanism, etc., or with non-food processing systems. In the illustrated construction, the transfer mechanism 190' generally includes a dual opposing slot discharge arrangement.

The illustrated transfer mechanism 190' includes a conduit 194', a fluid discharge 198' (shown in FIGS. 10-11), a pressurized fluid source (not shown but similar to the pressurized fluid source 202 shown FIG. 7), a convex guide member 206', and a dewatering member 210'.

Similar to the conduits 94, 94A, 194, 294 of the transfer mechanisms 86, 90, 190, 290 discussed above, the illustrated conduit 194' has a generally rectangular cross-section. In the illustrated construction, the width of the conduit 194' is substantially constant from an inlet portion 214' of the conduit 194' to an outlet portion 218'.

The conduit 194' includes a lower wall 222', side walls 226', 230' and an upper wall 234'. In a manner similar to the conduit 194, the lower wall 222' and the side walls 226', 230' may integrally be formed as a three-sided member, and the upper wall 234' may be provided by a cover which is removably coupled to the side walls 226', 230'. In such a construction, the upper wall 234' may include lips (not shown) extending over portions of the side walls 226', 230' and may be partially captured under the convex guide member 206' to help retain the upper wall 234' in place. In other constructions, the upper wall 234' may be coupled to the side walls 226', 230' with clamps, fasteners, etc. In yet other constructions, the walls 222', 226', 230' and 234' may be formed integrally.

The conduit 194' defines a central axis 254' extending from the inlet portion 214' to the outlet portion 218'. The axis 254', and thereby the conduit 190', may be offset from and substantially parallel to, oblique to or aligned with and overlying the central longitudinal plane 150 extending through the tank 14 of the food processing system 10 or other system in which the transfer mechanism 190' is used.

In the illustrated construction, the conduit 194' includes an inlet conduit section 350 providing the inlet portion 214' and a main conduit section 354 connected to the inlet conduit section 350 and providing the outlet portion 218'. As shown in FIGS. 10-11, a first end 358 of the inlet conduit section 350 is in communication with a compartment (e.g., compartment 34, 38, 42) and below the fluid level in the compartment. A second end 362 of the inlet conduit section 350 fits within or is inserted into a first end 366 of the main conduit section 354. As discussed below in more detail, the inlet conduit section 350 and the main conduit portion 354 cooperate to define the fluid discharge 198'. In the illustrated construction, the inlet conduit section 350 is generally V-shaped, and the main conduit section 354 is generally inclined toward the outlet portion 218'.

In the illustrated construction, the fluid discharge 198' includes a pair of opposing slots 258' positioned proximate the inlet portion 214' of the conduit 194'. The illustrated slots 258' are vertically spaced apart, generally on the top and bottom of the conduit 194' (proximate the lower wall 222' and the upper wall 234'). In other constructions (not shown), in addition to or instead of the top and bottom slots 258', laterally spaced apart slots may be provided on the opposite sides of the conduit 194' (proximate each side wall 226', 230'). Each slot 258' is defined between an outer surface of the second end 362 of the inlet conduit section 350 and an inner surface of a first end 366 of the main conduit section 354.

Similar to the nozzles 158 and to the slot 258 discussed above, each slot 258' helps focus, and thereby pressurize, fluid from the fluid source, ensuring the fluid has sufficient flow strength to push food product upwardly through the conduit 194' to the outlet portion 218'. The slots 258' provide a continuous discharge of fluid along the entire width of and at the top and bottom of the conduit 194'. In the illustrated embodiment, each slot 258' has a height of approximately ⅛" to help focus and pressurize the fluid. In other constructions, the height of each slot 258' may be relatively larger or smaller (e.g., from about 3/16" to about 1/16") to allow more or less fluid to simultaneously flow out of the slot 258'. In still other constructions, the size of the slot 258' may be even larger or smaller depending upon the desired capacity of the transfer mechanism 190'.

Each slot 258' is formed between the outer surface of the inlet conduit section 350 and the adjacent inner surface of the main conduit section 354. A portion of the associated wall (e.g., the lower wall 222' and the upper wall 234') of the main conduit section 354 may be bent to form, in cooperation with the outer surface of the inlet conduit section 350 and with side walls 368, a generally teardrop-shaped chamber or opening 262'.

An outlet pipe 270' of the pressurized fluid source (e.g., a pump (not shown)) is in fluid communication with each opening 262'. The outlet pipe 270' includes a main pipe 370 which branches off into a pipe section 374, 378 connected to each opening 262'. In the illustrated construction, the pipe sections 374, 378 extend through the associated wall 222', 234' of the conduit 194' and into the associated opening 262'. The outlet pipe 270' directs fluid from the pump, through the main pipe 370 and through the pipe sections 374, 378, into each opening 262', and out of each slot 258'. In other constructions (not shown), a separate pipe may be in fluid communication between the pump and each opening 262'.

Similar to the transfer mechanisms 86, 90, 190 discussed above, the fluid discharge 198' and the pump generate a vacuum force at the inlet portion 214' of the conduit 194'. The vacuum force helps draw food product into the inlet portion 214' such that the pressurized fluid exiting the slots 258' can move the food product toward the outlet portion 218'.

In the illustrated construction, the dual opposing slot arrangement of the transfer mechanism 190' effectively doubles the width of the plenum when compared to the transfer mechanism 190. To maintain the same flow rate, the width of the conduit 194' is reduced relative to the width of the conduit 194 (e.g., by about one half), and the depth is increased (e.g., approximately doubled). The dual opposing slot arrangement mirrors the fluid flow effect with each slot 254' (e.g., at the top and bottom of the conduit 194') which may keep food product toward the middle of the conduit 194' (away from the wall associated with each slot 258'). This arrangement also may allow a larger opening for the inlet portion 214' to accommodate larger-sized food products (e.g., larger than about 1" in diameter).

In the transfer mechanism 190', the slots 258' may be positioned relatively farther away from the inlet portion 214' (when compared to the transfer mechanism 190) to allow the food product to accelerate before the transition to full flow rate near the slots 258' so that this transition is not as abrupt. The added distance (approximately 15") generally enables the food product to accelerate before hitting the high velocity transition at the location of the slot 258'.

With the slotted arrangement, the velocity of the fluid ejected from each slot 258' is greater generally toward the center of the slot 258' (between the inner surface of a first end 366 of the main conduit section 354 and the outer surface of the second end 362 of the inlet conduit section 350) and decreases toward the middle of the conduit 194' (and toward the associated wall (e.g., wall 222' or 234')). The food product tends to stay toward the middle of the conduit 194' in an area of lower flow rate fluid. This may contribute to the slotted arrangement being gentler on food products when compared to a nozzle arrangement.

The main conduit section 354 is connected to the convex guide member 206' and to the dewatering member 210'. In the illustrated construction, the dewatering member 210' may have generally the same size and shape as the dewatering member 210 in the transfer mechanism 190. However, because the conduit 194' has a relatively narrower width and increased depth compared to the conduit 194, the convex guide member 206' generally flares to the width of and tapers to the depth of the dewatering member 210'.

Figure 12:
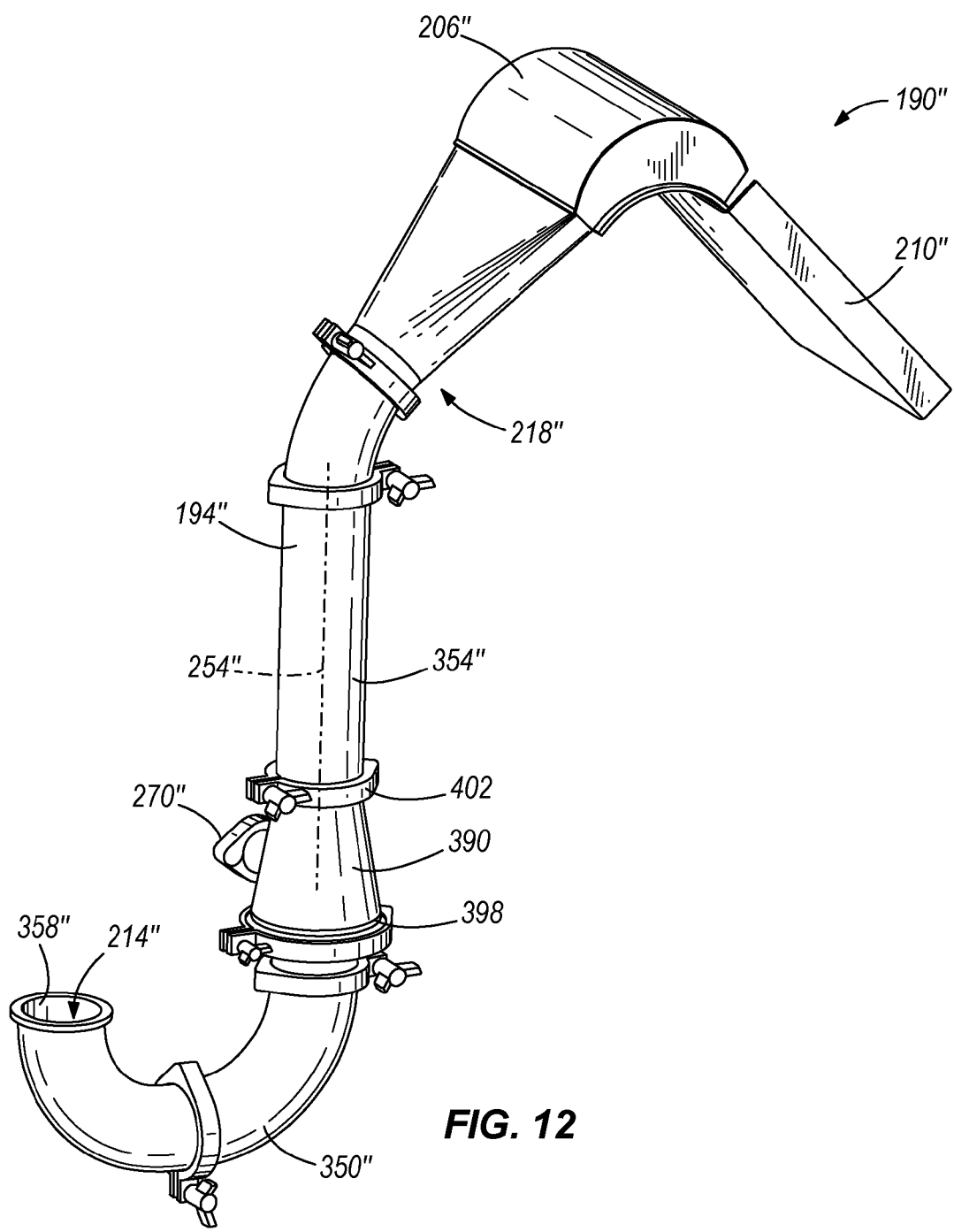
FIG. 12 is a perspective view of another transfer mechanism.
Figure 13:
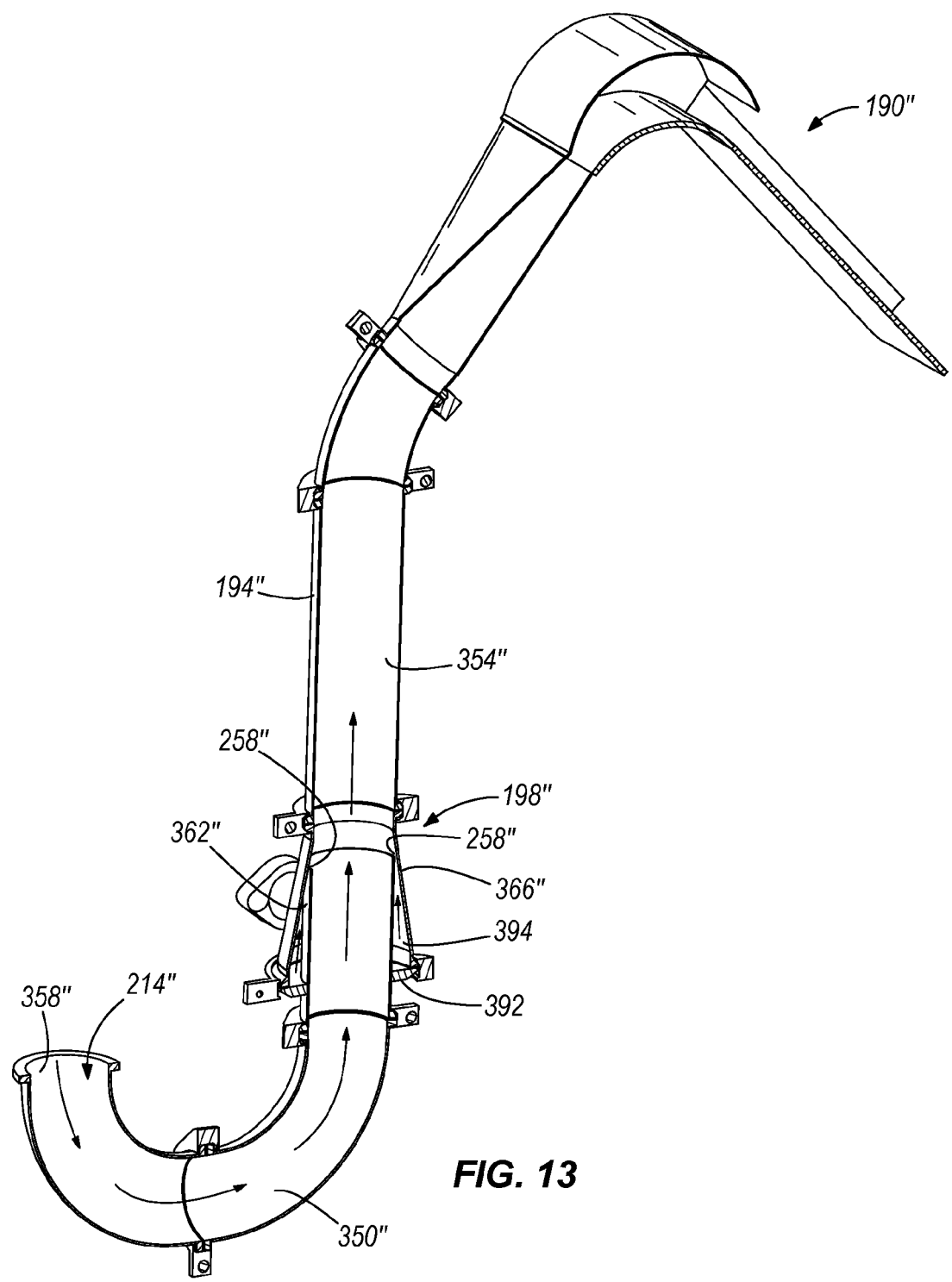
FIG. 13 is a cross-sectional view of the transfer mechanism shown in FIG. 12.
Figure 14:
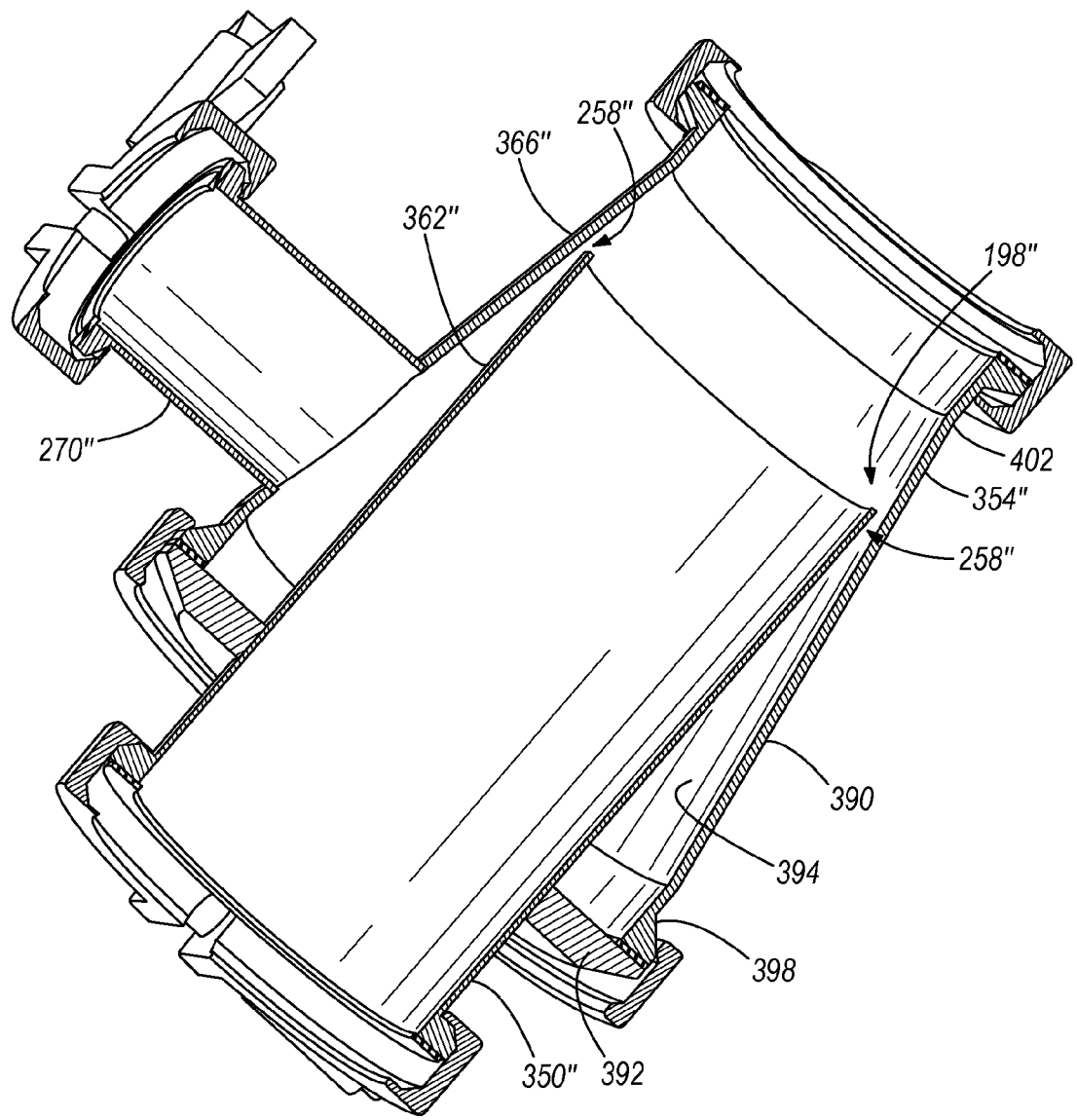
FIG. 14 is an enlarged cross-sectional view of a portion of the transfer mechanism shown in FIG. 13.

FIGS. 12-14 illustrate another alternative construction of a transfer mechanism 190". The illustrated transfer mechanism 190" is similar to the transfer mechanisms 190, 190' discussed above with respect to FIGS. 6-12 and/or to the first and second transfer mechanisms 86, 90 discussed above with reference to FIGS. 1-5. Like parts have been given the same reference numbers """. Reference is hereby made to the description of the transfer mechanisms 86, 90, 190, 190' above for details of the structures and operation, as well as alternatives to the structures and operation, of the transfer mechanism 190' not specifically discussed herein.

The transfer mechanism 190" may be used with the food processing system 10 shown in FIG. 1 or with other types of food processing systems, such as, for example, a cooker, a cooler, a transport mechanism, etc., or with non-food processing systems. In the illustrated construction, the transfer mechanism 190" includes a generally round conduit 194" with an annular discharge arrangement.

The illustrated transfer mechanism 190" includes a conduit 194", a fluid discharge 198" (shown in FIGS. 13-14), a pressurized fluid source (not shown but similar to the pressurized fluid source 202 shown FIG. 7), a convex guide member 206", and a dewatering member 210".

As mentioned above, the illustrated conduit 194" has a generally round cross-section. In the illustrated construction, the diameter of the conduit 194" is substantially constant from an inlet portion 214" of the conduit 194" to an outlet portion 218". The conduit 194" defines a central axis 254" extending from the inlet portion 214" to the outlet portion 218". The axis 254", and thereby the conduit 194", may be offset from and substantially parallel to, oblique to or aligned with and overlying the central longitudinal plane 150 extending through the tank 14 of the food processing system 10 or other system in which the transfer mechanism 190" is used.

In the illustrated construction, the conduit 194" includes an inlet conduit section 350" providing the inlet portion 214" and a main conduit section 354" connected to the inlet conduit section 350" and providing the outlet portion 218". As shown in FIGS. 13-14, a first end 358" of the inlet conduit section 350" is in communication with a compartment (e.g., compartment 34, 38, 42) and below the fluid level in the compartment. A second end 362" of the inlet conduit section 350" fits within or is inserted into a first end 366" of the main conduit section 354". As discussed below in more detail, the inlet conduit section 350" and the main conduit portion 354" cooperate to define the fluid discharge 198". In the illustrated construction, the inlet conduit section 350" is generally U-shaped, and the main conduit section 354" includes a substantially vertical portion.

In the illustrated construction, the fluid discharge 198" includes an annular slot 258" positioned proximate the inlet portion 214" of the conduit 194". The illustrated slot 258" extends substantially about the perimeter of the second end 362" of inlet conduit section 350". The slot 258" is defined between an outer surface of the second end 362" of the inlet conduit section 350" and an inner surface of a first end 366" of the main conduit section 354". In other constructions (not shown), the fluid discharge 198" may include one or more slots which extend only about a portion of the circumference.

Similar to the nozzles 158 and to the slot 258, 258', discussed above, the slot 258" helps focus, and thereby pressurize, fluid from the fluid source, ensuring the fluid has sufficient flow strength to push food product upwardly through the conduit 194" to the outlet portion 218". The slot 258" provides a continuous discharge of fluid about the circumference of interior of the conduit 194". In the illustrated embodiment, the slot 258" has a height of approximately ⅛" to help focus and pressurize the fluid. In other constructions, the height of the slot 258" may be relatively larger or smaller (e.g., from about 3/16" to about 1/16") to allow more or less fluid to simultaneously flow out of the slot 258". In still other constructions, the size of the slot 258" may be even larger or smaller depending upon the desired capacity of the transfer mechanism 190".

As mentioned above, the slot 258" is formed between the outer surface of the inlet conduit section 350" and the adjacent inner surface of the main conduit section 354". The main conduit section 354" includes a conical portion 390 surrounding a portion of the outer surface of the inlet conduit section 350" upstream of the slot 258" to form, with an end plate 392, a chamber 394 surrounding the portion of the inlet conduit section 350". An outlet pipe 270" of the pressurized fluid source (e.g., a pump (not shown)) is in fluid communication with the chamber 394. The outlet pipe 270" directs fluid from the pump, into the chamber 394 and out of the slot 258".

The conical portion 390 has a first diameter section 398 with a diameter larger than the outer diameter of the inlet conduit section 350" and tapers to a second diameter section 402 having a diameter about equal to the inner diameter of the inlet conduit section 350". The inlet conduit section 350" is inserted to position between the first diameter section 398 and the second diameter section 402 to define the slot 258" with the desired height. With this arrangement, the conduit 194" generally has the same interior diameter throughout the inlet conduit section 350 and the main conduit section 354".

Figure 16:
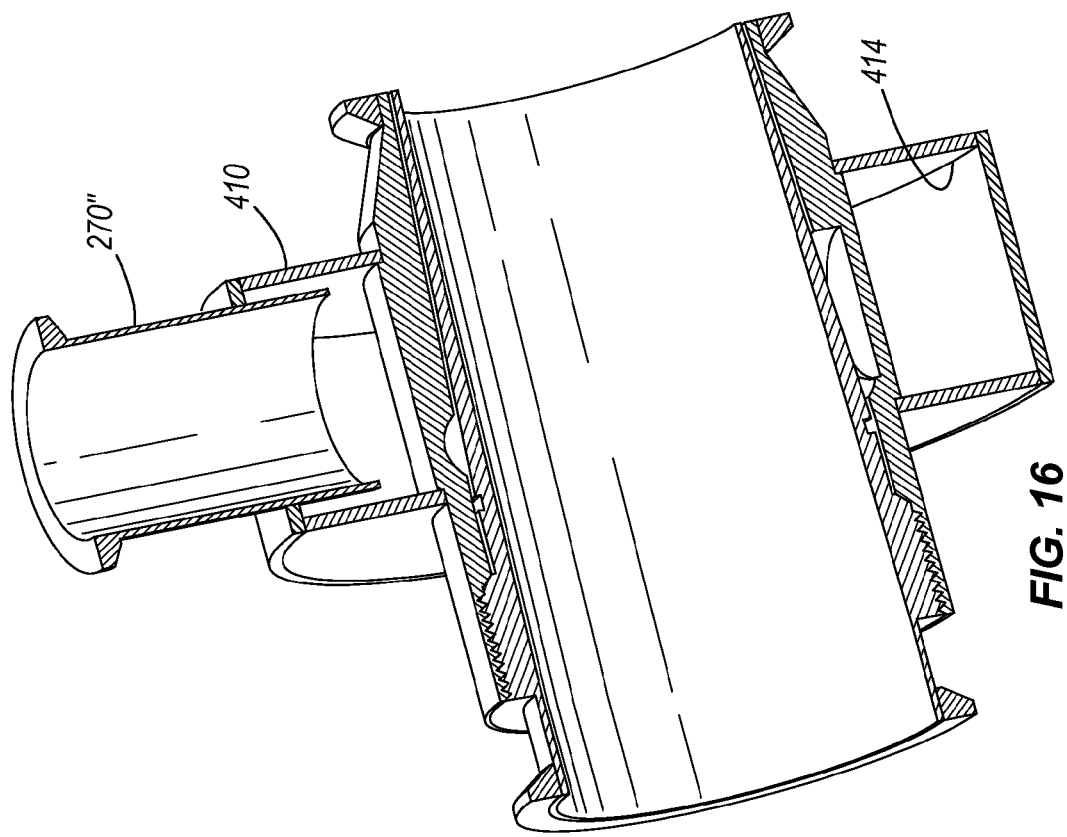
FIG. 16 is a cross-sectional view of the portion of the transfer mechanism shown in FIG. 15.
Figure 15:
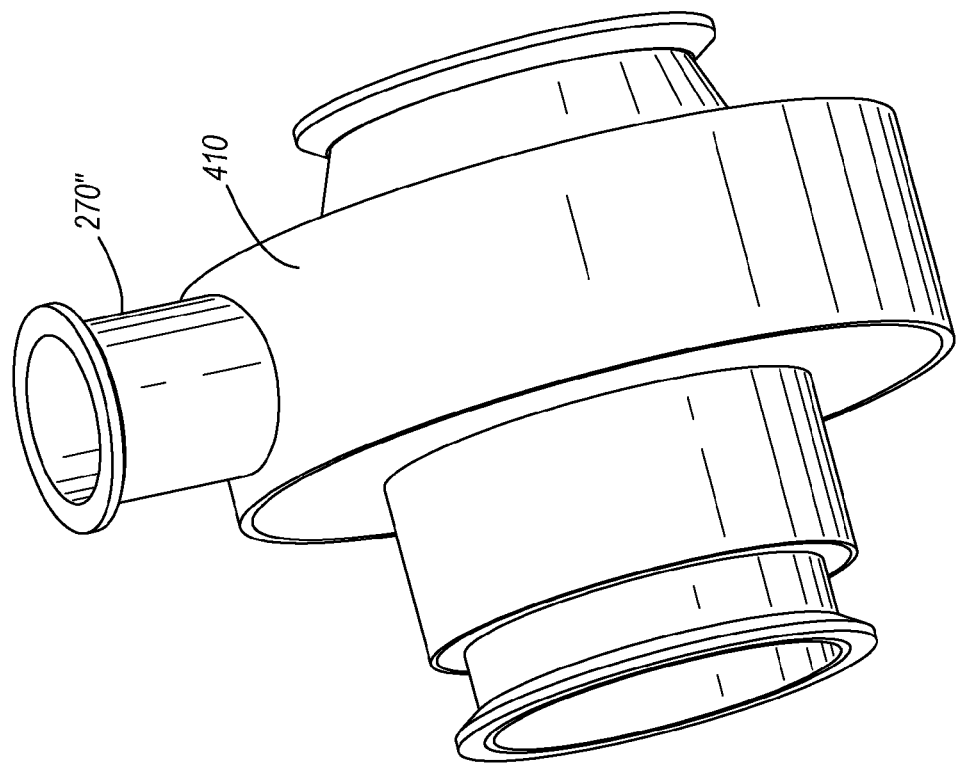
FIG. 15 is a perspective view of an alternative construction of the portion of the transfer mechanism shown in FIG. 14.

FIGS. 15-16 illustrate an alternative construction for the conical section 390 of the main conduit section 354" shown in FIG. 14. In the illustrated construction, a ring-shaped member 410 defines an annular chamber 414 to which the outlet pipe 270" is connected. Fluid is supplied from the pump, into the chamber 414 and out of the annular slot (not shown). In the illustrated construction, the components may be machined to allow more precise slot openings and/or adjustment of the size of the slot openings.

Similar to the transfer mechanisms 86, 90, 190, 290, 190' discussed above, the fluid discharge 198" and the pump generate a vacuum force at the inlet portion 214" of the conduit 194". The vacuum force helps draw food product into the inlet portion 214" such that the pressurized fluid exiting the slot 258" can move the food product toward the outlet portion 218".

The annular slot arrangement provides the fluid flow effect around the circumference of the interior of the conduit 194" which tends to keep food product toward the middle of the conduit 194" (and away from the wall of the conduit 194"). This arrangement also may allow a larger opening for the inlet portion 214" to accommodate larger-sized food products (e.g., larger than about 1" in diameter).

In the transfer mechanism 190", the slot 258" may be positioned relatively farther away from the inlet portion 214" (when compared to the transfer mechanisms 190, 190') to allow the food product to accelerate before the transition to full flow rate near the slot 258" so that this transition is not as abrupt. The added distance (approximately 25") generally enables the food product to accelerate before hitting the high velocity transition at the location of the slot 258".

Also, with the annular slot arrangement, the velocity of the fluid ejected from the slot 258" is greater generally toward the center of the slot 258" (between the inner surface of a first end 366" of the main conduit section 354" and the outer surface of the second end 362" of the inlet conduit section 350") and decreases toward the middle of the conduit 194" (and toward the wall of the conduit 194"). The food product tends to stay toward the middle of the conduit 194" in an area of lower flow rate fluid. Again, this may contribute to the slot arrangement being gentler on food products when compared to a nozzle arrangement.

The round shape of the conduit 194" may provide increased flexibility with respect to, for example, sanitation, orientation, etc. As mentioned above, the round shape of the conduit 194" provides a flow effect that is annular about the circumference of the interior of the conduit 194". The round conduit 194" may be gentler on food products but also may be more efficient, have greater capacity, provide higher lift, provide easier piping opportunities, etc.

With the round conduit 194", the transfer mechanism 190" may enable the food product to be lifted vertically through a significant portion of the conduit 194". The vertical portion of the conduit 194" generally decreases the overall length of the transfer mechanism 190" and the space requirement in the associated processing system.

The round main conduit section 354" is connected to the convex guide member 206" and to the generally rectangular dewatering member 210". In the illustrated construction, the dewatering member 210" may have generally the same size and shape as the dewatering member 210, 210' in the transfer mechanisms 190, 190'. However, because the conduit 194" has a round cross-section with a diameter that is smaller than the width and greater than the depth of the generally rectangular conduit 194, the convex guide member 206" (and/or the downstream end of the main conduit section 354") transitions from the round cross-section of the conduit 194" to the rectangular cross-section of the dewatering member 210". The convex guide member 206" also generally flares to the width of and tapers to the depth of the dewatering member 210".

In each of the above-described constructions, the propulsion velocity of the slot/nozzle is about 15 ft/sec to 25 ft/sec, and the overall velocity in the transfer mechanism is about 3.5 ft/sec to 5 ft/sec. If a product is already moving at nearly 5 ft/sec, and then is hit with 15 ft/sec acceleration, the product will experience a 3g force. However, if the product is barely moving when it enters the high velocity area at the slot/nozzle, the product can experience up to 8 times that force. Accordingly, acceleration of the product before reaching the high velocity transition at the slot(s)/nozzle(s) will reduce the force on and may reduce damage/potential for damage to the product. Positioning the slot(s)/nozzle(s) relatively farther away from the inlet may allow the food product to accelerate before the transition to full flow rate near the slot(s)/nozzle(s) so that this transition is not as abrupt.

The nozzle arrangement of the transfer mechanisms 86, 90 generally provides good lift of food product above the fluid level in the compartment and is suitable for many types of food product, especially relatively durable food products. However, some types of food products, especially fragile food products (e.g., cooked ravioli, tortellini, etc.), may be damaged at the point the food product abruptly accelerates near the high velocity nozzles 158, and the potential for damage increases as the pressure and flow through the nozzles 158 is increased to move food product higher above the fluid level in the compartment.

With respect to the profile of the velocity transition in relation to a slot/nozzle in relation to the overall area of the conduit, a nozzle (e.g., nozzle 158) may cause severe disturbance in the center of the conduit (e.g., conduit 94), and, with multiple nozzles, there may be significant cross-interference in the flow in the conduit.

In contrast, with a slotted arrangement (e.g., in transfer mechanisms 190, 290, 190', 190"), one or more slots along the side of the conduit force at least one-half of the disturbance to be along the outer wall of the conduit (e.g., conduit 194, 290, 194', 194"), where this flow cannot effect the product. The slotted arrangement of the transfer mechanisms 190, 290, 190' generally limits the high velocity area toward the outer edge of the conduit 194, 294, 194', and the food product generally tends to stay in the lower velocity flow area toward the middle of the conduit 194, 294, 194'.

The transfer mechanism 190 with a single slot 254 on only one side of the conduit 194, while generally providing good lift and transport of products, is limited to relatively narrow plenums due to flow effectiveness (e.g., the single slot 254 may be only effective to about 12 times the width of the slot 254). Beyond that, the food product may become trapped along the side of the conduit 194 opposite the slot 254.

The transfer mechanism 190" with the annular slot 258" and the round conduit 194" is generally able to handle the most fragile food products (e.g., cooked ravioli, tortellini, etc.) and lift the food product to the desired height. The transfer mechanism 190" can also handle and lift products larger than about 1" in diameter.

Although the invention has been described in detail with reference to certain embodiments, variations and modifications exist within the scope and spirit of one or more independent aspects of the invention as described. Various features and advantages of the invention are set forth in the following claims.

What is claimed is:

1. A food processing system comprising:
    a compartment operable to process a food product; and
    a transfer mechanism for transferring food product from the compartment;
    the transfer mechanism including:
        a conduit including
            a first end portion, including an inlet conduit section, wherein food product enters the transfer mechanism through the inlet conduit section, and wherein the inlet conduit section has a a circumference, the first end portion configured to be in communication with the compartment, wherein the first end portion of the conduit is configured to be positioned below a fluid level in the compartment,
            a main conduit section, wherein the main conduit section has a cross-section, and
            a second end portion, wherein the second end portion of the conduit is configured to be positioned above the fluid level in the compartment
            the inlet conduit section having an inlet end in fluid communication with the compartment and an opposite end with an outer surface, and
            the main conduit section having a first end with an inner surface, the opposite end of the inlet conduit section being inserted in the first end of the main conduit section;
        a fluid discharge positioned substantially within the conduit between the first end portion and the second end portion, the fluid discharge including a slot at least partially defined between the outer surface of the opposite end of the inlet conduit section and the inner surface of the first end of the main conduit section, wherein the fluid discharge includes a slot at least partially defined between the outer surface of the opposite end of the inlet conduit section and the inner surface of the first end of the main conduit section; and
        a pressurized fluid source in communication with the fluid discharge, the pressurized fluid source operable to propel a fluid through the through the slot to move the food product from the first end portion of the conduit toward the second end portion.

2. The food processing system of claim 1, wherein the first end portion of the conduit is configured to be positioned below the fluid level in the compartment, wherein the second end portion of the conduit is configured to be positioned above a fluid level in the compartment, and wherein the conduit includes a substantially vertical portion between the first end portion and the second end portion.

3. The food processing system of claim 1, further comprising a dewatering member in communication with the second end portion of the conduit, wherein the dewatering member receives the food product and the fluid from the conduit and facilitates separating the food product from the fluid.

4. The food processing system of claim 3, further comprising a convex guide member positioned between the second end portion of the conduit and the dewatering member, wherein the convex guide member directs the food product and the fluid from the conduit into the dewatering member.

5. The food processing system of claim 4, wherein the convex guide member and the dewatering member form a generally inverted V-shape.

6. The food processing system of claim 4, and further comprising an outlet pipe in fluid communication between the pressurized fluid source and the fluid discharge, the outlet pipe including
    a main pipe section in fluid communication with the pressurized fluid source, a first pipe section in fluid communication between the main pipe section and the first-mentioned opening, and
    a second pipe section in fluid communication between the main pipe section and the second opening.

7. The food processing system of claim 6, wherein the pressurized fluid source includes a pump operable to supply fluid through the outlet pipe and through the first slot and the second slot.

8. The food processing system of claim 1, wherein the compartment is operable to at least one of cook and cool the food product.

9. The food processing system of claim 1, wherein the transfer mechanism transfers the food product from the compartment out of the food processing system.

10. The food processing system of claim 1, and further comprising a second compartment operable to process the food product, wherein the second end portion of the conduit is in communication with the second compartment to transfer the food product from the compartment to the second compartment.

11. The food processing system of claim 10, wherein the first compartment is operable to cook the food product and the second compartment is operable to cool the food product.

* * * * *